United States Patent
Büsgen et al.

(10) Patent No.: US 6,419,263 B1
(45) Date of Patent: Jul. 16, 2002

(54) SEATBELT SYSTEM HAVING SEAMLESS INFLATABLE MEMBER

(75) Inventors: Alexander Büsgen, Wuppertal (DE); S. Jay Cross, Scottsdale, AZ (US); Edward Lee Morris, Jr., Phoenix, AZ (US); Lowell William Roemke, Tempe, AZ (US); William Lewis Walthall, Scottsdale, AZ (US)

(73) Assignee: The B. F. Goodrich Company, Charlotte, NC (US)

( * ) Notice: Subject to any disclaimer, the term of this patent is extended or adjusted under 35 U.S.C. 154(b) by 0 days.

(21) Appl. No.: 09/462,626

(22) PCT Filed: May 11, 1998

(86) PCT No.: PCT/US98/09659
§ 371 (c)(1),
(2), (4) Date: Dec. 20, 1999

(87) PCT Pub. No.: WO98/51542
PCT Pub. Date: Nov. 19, 1998

(51) Int. Cl.[7] .............................................. B60R 21/18
(52) U.S. Cl. ................... 280/733; 280/743.1; 139/389
(58) Field of Search ............................. 280/733, 743.1, 280/728.1, 729; 139/389, 390; 428/35.2, 36.1

(56) References Cited

U.S. PATENT DOCUMENTS

| | | | | |
|---|---|---|---|---|
| 3,730,551 A | * | 5/1973 | Sack et al. ............... | 280/743.1 |
| 3,842,583 A | * | 10/1974 | Gage ........................ | 139/389 |
| 3,848,887 A | * | 11/1974 | Fox .......................... | 280/733 |
| 3,866,940 A | * | 2/1975 | Lewis ...................... | 280/733 |
| 3,888,503 A | * | 6/1975 | Hamilton ................. | 280/733 |
| 3,897,081 A | * | 7/1975 | Lewis ...................... | 280/733 |
| 3,953,640 A | * | 4/1976 | Takada ..................... | 280/733 |
| 3,970,329 A | * | 7/1976 | Lewis ...................... | 280/733 |
| 5,303,953 A | * | 4/1994 | Kamiyama et al. ...... | 280/733 |
| 5,393,091 A | * | 2/1995 | Tanaka et al. ............ | 280/733 |
| 6,000,442 A | * | 12/1999 | Busgen .................... | 139/389 |
| 6,142,511 A | * | 11/2000 | Lewis ...................... | 280/733 |

FOREIGN PATENT DOCUMENTS

| | | | |
|---|---|---|---|
| WO | WO 96/31643 | * | 10/1996 |
| WO | WO 97/06983 | * | 2/1997 |

* cited by examiner

*Primary Examiner*—Lanna Mai
*Assistant Examiner*—Ruth Ilan
(74) *Attorney, Agent, or Firm*—Jerry J. Holden

(57) ABSTRACT

A passenger restraint system (100) for an occupant of a vehicle (102) includes an inflatable belt portion comprising a seamless hollow inflatable textile member that becomes inflated upon the occurrence of a collision. The inflatable textile member may vary in size and construction along its length. The belt portion (104, 112) tightens against the occupant's body when the inflatable belt portion becomes inflated.

21 Claims, 8 Drawing Sheets

SEATBELT SYSTEM HAVING SEAMLESS INFLATABLE MEMBER

BACKGROUND OF THE INVENTION

This invention relates to a system for, and method of, providing a seamless inflatable member such as an inflatable bag or seat belt, in a vehicle and inflating the member to protect an occupant when a collision involving the vehicle occurs.

BACKGROUND OF THE INVENTION

Safety of occupants in vehicles is an important concern to manufacturers of the vehicles and to the occupants of the vehicles. The manufacturers have disposed seat belts, some partially or wholly inflatable, and inflatable air bags in the vehicles to protect the occupants when collisions involving the vehicle occur. An inflatable member (this term is used herein to describe an air bag as well as an inflatable belt or an inflatable belt portion) becomes inflated upon the occurrence of a collision involving a vehicle to reduce the occupant's velocity and deceleration below unacceptable rates and to limit the occupant's movement to enhance the occupant's safety. Many manufacturers have started to provide inflatable members for occupants of the front driver seat of an automobile. Most automobile manufacturers now provide 3-point seat belts which include a shoulder belt portion and a lap belt portion. Most aircraft passenger seats are now provided with 2-point seat belts which include only a lap belt portion. The number of points refers to the number of anchors or retainers that affix the safety belt system for an occupant.

Perhaps the most significant consideration in a vehicle containing an inflatable member relates to the fact that such a member cannot begin to restrain the occupant's motion during the vehicle collision until the occupant has moved into engagement with such member. Air bags that are typically deployed from the dashboard or steering wheel waste an important portion of the time and deceleration space available to protect the occupant against injury. This markedly reduces the occupant's protection from the level that can be provided if the restraint is initiated before the occupant has moved within the vehicle after initiation of the vehicle collision.

Non-inflatable seat belts now in use suffer from certain significant disadvantages. For example, although certain selected designs of seat belts can, through the use of pre-tensioning devices, begin a restraint of the occupant earlier than the restraint provided by an air bag deployed from the dashboard or steering wheel, such belts do not provide for control of the occupant's head motion. This shortened deceleration time, however, has caused markedly higher decelerations and loadings, at least of the occupant's head, and has produced less than desirable results from the standpoint of injury thereto.

Seat belts are also often of narrow physical construction and thus have not provided for the distribution of the restraining loads over wide areas of the occupant's body. This has resulted in unnecessarily high loads being imposed upon the occupant over the limited portion of the occupant's body in engagement with the seat belt when a collision involving the vehicle occurs. Additionally such belts have possessed an elongation that, in many situations, has allowed the head of an occupant to strike the steering wheel or the dashboard when the occupant has been seated in a front seat.

Furthermore, the spooling out of the webbing material in the seat belt and the stretching of the seat belt have contributed to an increased duration of the unrestrained motion of the occupant before any effective restraint. This has meant that the motion of the occupant has had to be brought to a stop in a shorter time than would have been possible if the seat belt had not elongated. This has contributed to the production of undesirably high rates of motion and deceleration on the occupant during the restraint imposed by the seat belt on the movement of the occupant.

Use of inflatable seat belts of the types known in the prior art does not overcome all of the deficiencies and disadvantages discussed above. Many prior attempts at eliminating these deficiencies and disadvantages with inflatable belts have included seat belts with a pair of inflatable sections within the belt (one for the shoulder belt portion, the other for the lap belt portion) and have additionally required the inflation of these sections to be accomplished by larger than desirable inflators. Many previous attempts at producing satisfactory inflatable belts have also resulted in serious problems with storing the pair of inflatable sections in the vehicle and have required these inflatable sections to occupy areas that interfere with entrance and egress of the occupant respectively into and from the vehicle.

The deficiencies and disadvantages of many prior art inflatable seat belts have also required the inflators to be positioned at the releasable coupling member and the retainer to be positioned at the sides of the seats. This duality of inflatable sections has caused many significant problems. One of these has been that the inflatable gases have had to pass through conduits located at the buckle attachment point of the belts that are in themselves releasable. This makes the belts and the inflator difficult to package and to operate.

The inflatable belts with dual inflatable sections have had to be attached to mechanisms which allow for variable lengths of the belts to be deployed due to variable sizes and positions of the occupants within the vehicle. This has required the inflator to be located at the buckle location with the aforementioned deficiencies or has required the heavy mass of the inflator to be contained within the inflatable sections of the seat belts. Furthermore, the duality of inflatable sections has required additional inflators, squibs, wiring and the like to be used since both of the inflatable sections in the pair have had to be simultaneously inflated.

Most inflatable seat belts known in the prior art have other significant deficiencies and disadvantages. For example, they do not adequately protect the occupant's neck and head in a side collision. Furthermore, they also do not adequately protect the occupant's lower extremities. This results from the fact that the front seat occupant's lower extremities tend to slide forward against the instrument panel at the time of the collision while the occupant in the rear seat tends to slide against the rear of the front seat. This "submarining" has caused the occupants to incur injuries to the lower extremities.

The inflators associated with most prior inflatable seat belts have operated in an inefficient thermodynamic manner, and thus have required relatively large amounts of pyrotechnic materials to be provided in the inflators so that the size and weight of the inflators have had to be increased to undesirable proportions. The amount of the pyrotechnic material required in most of the inflators of the prior art has been roughly between fifty percent (50%) to one hundred percent (100%) more than is used in the preferred inflator of this invention. As a result, acceptable packaging of most prior art inflatable belts and the inflator within a vehicle has been precluded.

The configuration and composition of the combustible materials used in most existing inflators have also produced relatively slow inflation systems. These slow inflation systems, while useful for air bags, have not been useful for inflatable seat belts since such restraints must deploy in less than one fourth of the time for the deployment of a typical air bag, to be effective, particularly to provide occupant protection from side impacts. The deceleration distance of a vehicle involved in a side collision and the time interval between the initiation of the side impact against the vehicle and the striking of the occupant against an interior vehicle surface are greatly reduced relative to the distance and time for a front impact.

The combustible materials for some of these known systems have also required filters to collect the solid particulates that are produced in operation. Other known systems have utilized pyrotechnic grains of such size that grain fracture and cracking have occurred and have caused variations in the combustion surface, thereby detrimentally affecting the burning rates within the grains and hence the inflation time. Furthermore, when large grains have been utilized with slow burning rates, the variations in performance over the range of operating temperatures have been undesirably large, resulting in variations in protection. For example, assuming a 40–50 millisecond function time, the changes in the burning rate of the pyrotechnic material have caused the function time of the inflator to vary by approximately ±20% when the temperature has been varied between 175° F. and −65° F. This considerable percentage change in the burning rate has produced a change in overall function time of approximately 15–20 milliseconds, an appreciable portion of the time available to an air bag to decelerate the movement of the occupant, given that a typical frontal impact of an automobile lasts only about 120 milliseconds.

BRIEF DESCRIPTION OF THE INVENTION

This invention provides a system which overcomes the above disadvantages and deficiencies. It comprises a seat belt combining a seamless hollow inflatable belt portion disposed across and adjacent the occupant's body which becomes tightened against the occupant's body when the inflatable portion becomes inflated. "Hollow" as used herein in reference to a textile structure means that such structure is capable of being inflated. In a first preferred embodiment, it comprises a 3-point seat belt combining a seamless generally tubular inflatable shoulder belt portion disposed across and adjacent the occupant's chest, neck and head and an interconnected lap belt portion which becomes tightened against the occupant's lap when the inflatable portion becomes inflated. In a second preferred embodiment, it comprises a 2-point seat belt having a seamless generally tubular inflatable belt portion disposed across and adjacent the occupant's lap which becomes tightened against the occupant's lap and extends upward toward the occupant's chest when the inflatable portion becomes inflated. Either of these enhanced restraints prevent the occupant in a front seat from sliding against the instrument panel or the steering wheel at the time of vehicular impact, thereby protecting against injury to the occupant's knees and lower extremities. Either of these enhanced restraints also prevents the occupant in a rear seat from sliding against the back of a front seat.

Furthermore, in the first embodiment that includes an inflatable shoulder belt portion, when inflated, the inflatable generally tubular belt portion shortens in effective length and displaces away from the chest of the occupant to provide, in combination, pretensioning of the inflatable belt portion, load distribution and a support cushion for the head in frontal collision. Additionally, by passing the inflatable belt portion across the shoulder and alongside the head, the inflatable generally tubular belt portion protects the occupant's neck and head from injury due to side impact.

An suitable inflator which responds almost instantaneously when a collision involving the vehicle occurs is described in WO 97123367 published Jul. 3, 1997, entitled "Inflatable Seat Belt System", naming Donald J. Lewis as inventor, which is incorporated herein by reference. For example, the inflator provides for the inflation of the inflatable belt portion in approximately ten milliseconds (10 ms) after being triggered by the vehicle collision. This is enabled in part by the use of a small pressure volume of approximately two (2) cubic inches in the inflator. This inflator is adapted for use with small particles of a pyrotechnic material, which provide a large surface that enhances the burning rates of such particles to provide for gas generation rates up to approximately ten (10) times greater than that of the inflators of the prior art. Furthermore, the relatively small amount of the pyrotechnic material in this inflator produces a minimal amount of any noxious by-products or noxious smells. This inflator is further advantageous in that all of the components in the inflator are disposed within a housing and in that a gas in the housing flows through a short outlet directly into the inflatable belt portion to inflate the inflatable belt portion almost instantaneously after triggering by the vehicle collision.

The gas flowing through the outlet of the inflator inflates an inflatable belt portion disposed across the occupant's body and attached to a vehicle support structure (e.g. a pillar behind the occupant's seat, the floor or a structural seat affixed to the vehicle support structure), thereby protecting the occupant's body.

The inflatable belt portion of this Invention may be integrally formed as by weaving to a webbing defining the remainder of the belt portion, or attached as by multiple stitching to webbing defining the remainder of the belt portion. Some of this stitching may be configured to become progressively, but not completely, detached to dissipate the forces imposed on the inflatable belt portion when the inflatable belt portion becomes inflated. Where the inflatable belt portion is disposed diagonally across the chest of the occupant and is joined to a lap belt portion, the lap belt portion is preferably arranged to slideably extend through an opening in a coupling member adjacent the inflatable belt portion and laterally across the occupant's lap.

In such an arrangement the lap belt portion becomes tightened against the occupant's lap when the inflatable belt portion becomes inflated. The lap belt portion is removably attached as by the coupling member to a retainer at the inner side of the seat. When the coupling member is detached from the retainer, the lap belt portion becomes disposed (e.g. wound) on a retractor to dispose the inflatable belt portion near the outboard seat side between the support structure (e.g. the pillar behind the driver's seat) and the retractor. The occupant can then enter and exit the vehicle without encumbrance. Alternatively, the retractor for the lap belt portion may be connected to the seat itself, and the seat attached to a vehicle support structure, e.g. the floor or frame of the vehicle.

The inflatable belt portion is preferably enveloped within a cover made from any suitable material; for example, a polyester or a nylon. The cover may be made from a single piece of material attached at its opposite ends as by stitching to define a flattened cylinder enveloping the inflatable belt portion. The cover stitching progressively separates as the inflatable belt portion becomes progressively inflated in a direction away from the inflator. The cover is advantageous in that it may designed to assist in providing for a controlled inflation of the inflatable belt portion in a direction away from the inflator. It also minimizes degradation of the material forming the inflatable belt portion as from ultraviolet light and protects the inflatable belt portion from degradation as from chafing against the occupant. A stiffener may be disposed in the cover against the inflatable belt portion to prevent the inflatable belt portion from twisting. Alternatively, the cover may be made from a frangible fabric material designed to burst open as the inflatable belt portion is inflated. Alternatively, the inflatable belt portion may contain an integral stiffener to prevent the inflatable belt portion from twisting. The cover may extend beyond the inflatable belt portion to define the remainder of the belt portion in place of standard webbing.

A switch may be disposed in the retainer in an open position. When the coupling member is disposed in the retainer, the switch becomes closed. The switch is included in an electrical circuit which is operative to initiate the combustion of the pyrotechnic material within the inflator, upon the occurrence of a collision involving the vehicle, when the switch is closed. In this way, the inflatable belt portion can become inflated upon the occurrence of a collision involving the vehicle only when the inflatable restraint system of this invention is connected to protect the occupant's body. This importantly avoids unnecessary deployment and attendant replacement costs of repairing a vehicle after a collision.

DETAILED DESCRIPTION OF THE INVENTION

Figure 3:
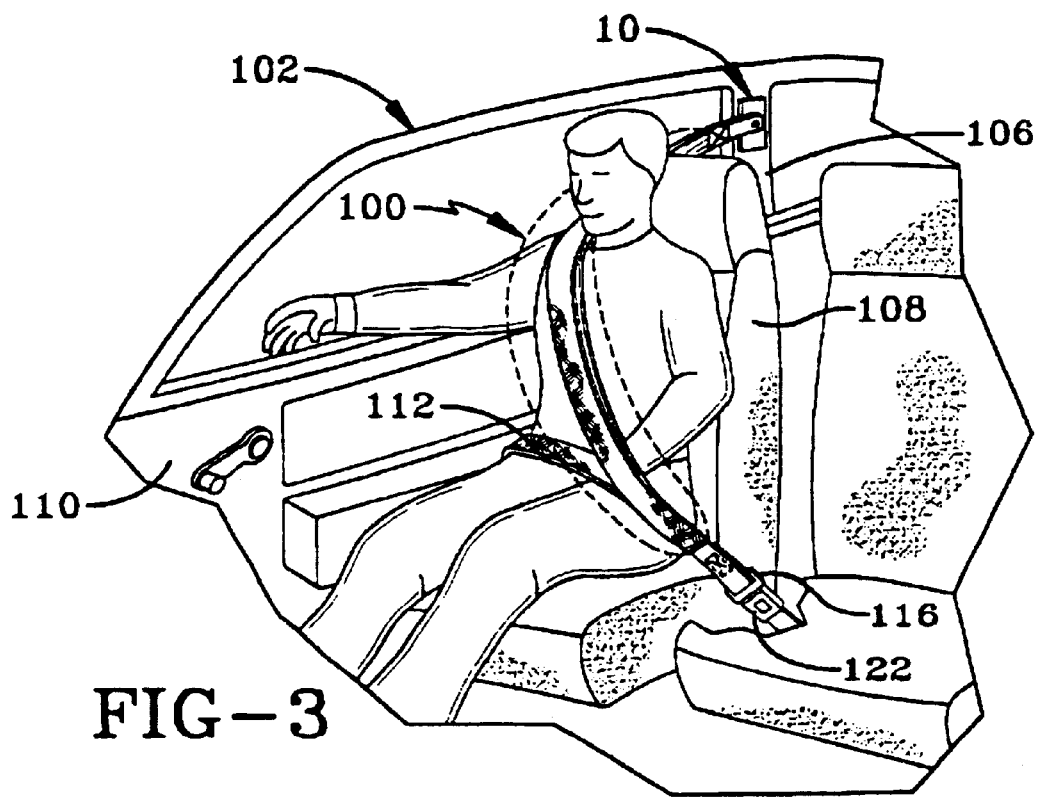
FIG. 3 is a schematic fragmentary perspective view of a vehicle including a unitary belt, comprising an inflatable shoulder belt portion and a non-inflatable lap belt portion, adapted to restrain the movements of an occupant seated in the vehicle in the event of a collision involving the vehicle.
Figure 4:
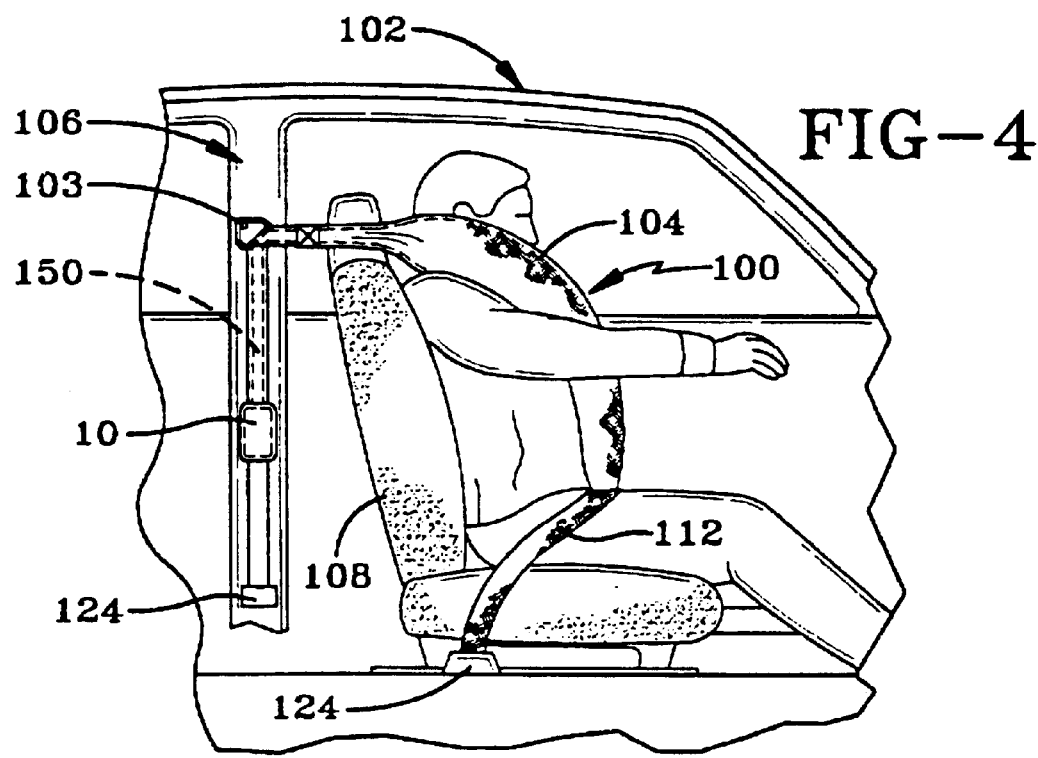
FIG. 4 is a schematic fragmentary side elevational view of the vehicle and the occupant seated in the vehicle and shows the disposition of the inflatable shoulder belt portion and the lap belt portion after the inflation of the inflatable belt portion.
Figure 21:
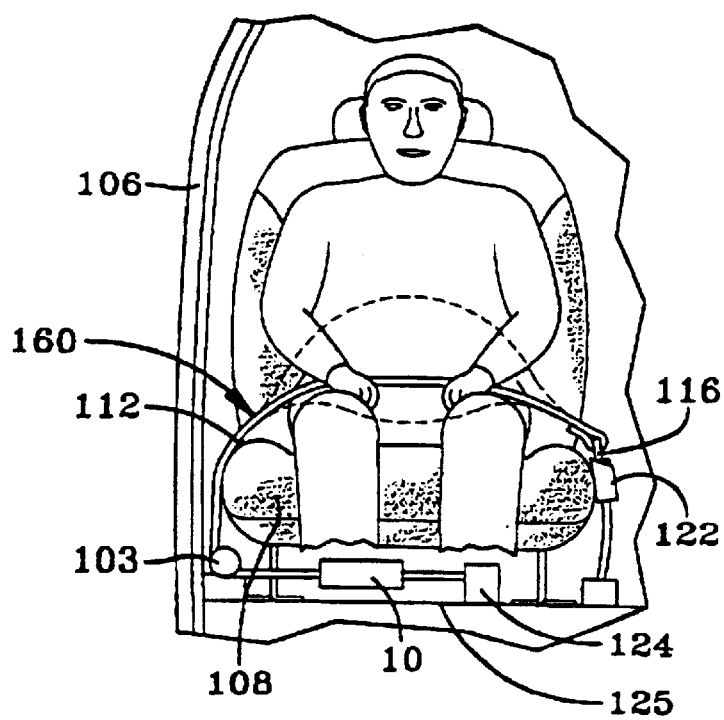
FIG. 21 is a fragmentary front elevational view of a seated occupant and shows another embodiment of a unitary belt, including the inflatable belt portion as the lap belt portion restraining the occupant.

The invention will first be described in reference to the unitary belt indicated generally at 100 (FIGS. 3 and 4). Thereafter, the invention will be described in reference to the unitary belt indicated generally at 160 (FIG. 21).

Figure 1:
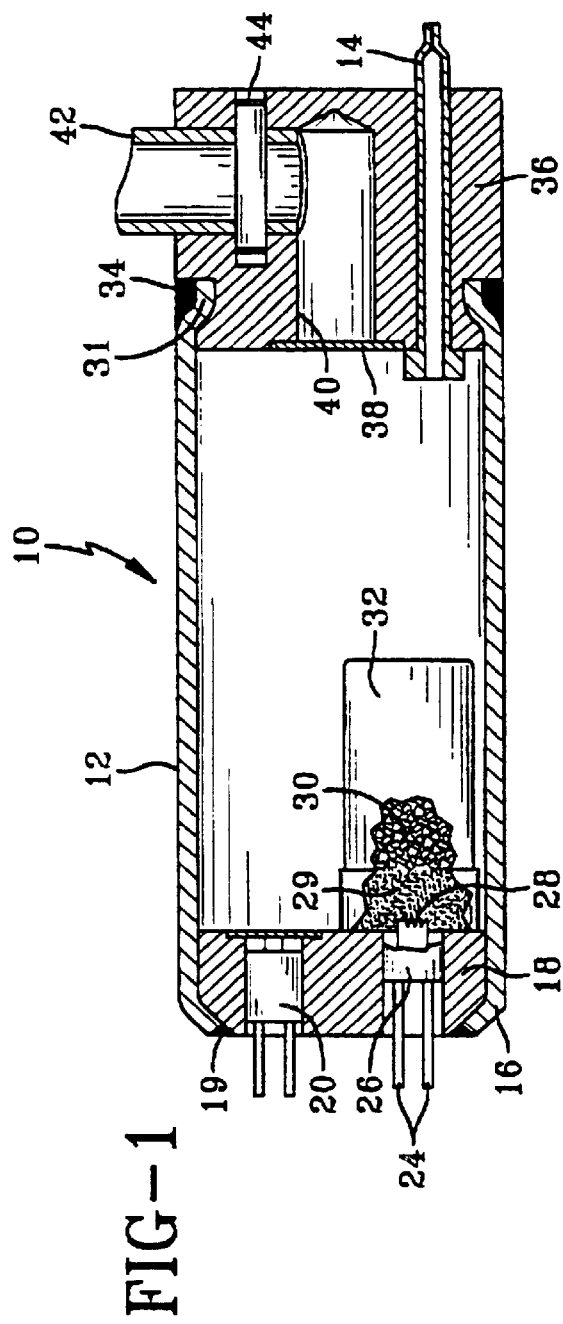
FIG. 1 is a sectional view of an inflator suitable for use with the invention, including a frangible container holding particles of a pyrotechnic material and including a housing enveloping the container and holding a gas, for producing thermodynamic energy for inflating an inflatable member such as an inflatable belt portion in a vehicle such as an automobile or aircraft.
Figure 2:
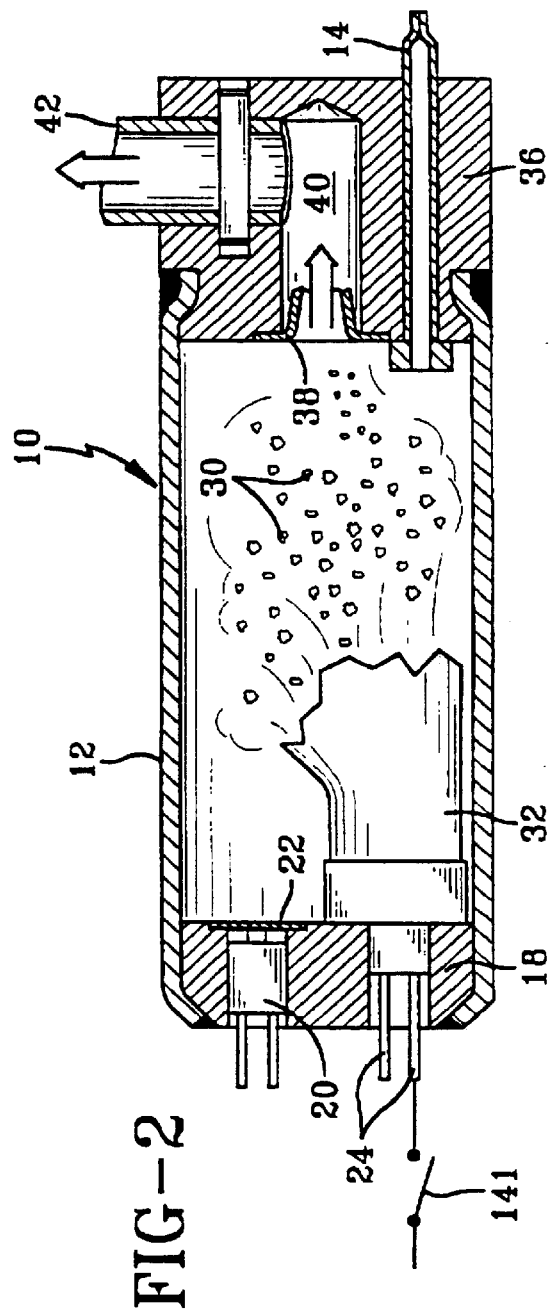
FIG. 2 is a sectional view similar to that shown in FIG. 1 but shows the inflator after the opening of the container as a result of a partial combustion of the particles of the pyrotechnic material in the container and further schematically shows the continued combustion of the pyrotechnic particles in the housing.

One embodiment of an apparatus (an inflator) for inflating an inflatable member such as an inflatable belt portion is generally indicated at 10 in FIGS. 1 and 2. In the embodiment of the inflator 10 shown in the drawings, a housing 12 is provided. The housing 12 may be made from a material with a low thermal conductivity to serve as a pressure vessel for holding a gas, preferably an inert gas such as nitrogen, helium or argon. Argon is the preferred gas. The gas may be inserted into the housing 12 through a hollow pin 14 which may be closed as by welding after the gas has been inserted into the housing.

The housing 12 may be crimped as at 16 to hold an insert 18 preferably having a low thermal conductivity. The housing 12 and the insert 18 may be formed from a metallic material preferably of a low thermal conductivity or from a material With an interior surface coating of a low thermal conductivity. The housing 12 and the insert 18 may also be formed from an epoxy, fiber glass, nylon or a number of other suitable materials having a low thermal conductivity, all which are well known in the art. A ring 19 is disposed in the housing 12 adjacent the crimp 16 to provide a seal for preventing gas leakage from the housing.

A switch 20 may be disposed in the insert 18. A diaphragm 22 may be pressed against the switch 20 when the pressure of the gas in the housing 12 exceeds a predetermined value. When the pressure of the gas in the housing 12 becomes less than such predetermined value, the diaphragm 22 becomes displaced from the switch 20. The switch 20 then becomes closed to illuminate a light on the instrument panel or display panel (not shown) at the front of the occupant compartment in the vehicle, thereby indicating that the inflator 10 is not operative. The operation of the switch 20 may provide a signal to associated electronic circuitry. This signal provides an indication that the inflator 10 is in a defective state. Such associated circuitry is believed to be known to a person of ordinary skill in the art.

The inflator 10 includes a suitable squib (also known as an initiator or igniter), which may be constructed as follows. A plug 26 may be made from a material having a low thermal conductivity. Preferably the plug 26 has the same composition as the material of the insert 18. Connector pins 24 extend into the plug 26. The connector pins 24 are connected electrically to a bridge wire 28. The bridge wire 28 is preferably coated or in direct juxtaposition with a first firing compound 29 which is selected to appropriately interface electronically and thermally with the electro-thermal characteristics of the bridge wire 28 so as to provide the desired ignition of particles of a pyrotechnic material 30. The bridge wire 28 and the first firing compound 29 are believed to be known in the art. The particles of the pyrotechnic material 30 are disposed within a frangible container 32 in juxtaposition to the first firing compound 29. The plug 26 electrically isolates the connector pins 24, one from the other, to prevent electrical shorting. The burning time of the pyrotechnic material 30 may be between approximately one millisecond (1 ms.) and approximately thirty milliseconds (30 ms.) and is preferably between approximately two millisecond (2 ms.) and approximately five milliseconds (5 ms.), depending upon the application.

The combustible or pyrotechnic material 30 may constitute relatively small particles or granules with a size in the range of approximately 0.010 inches to approximately 0.060 inches. The particles may typically have physical dimensions of approximately 0.050 inch in diameter and approximately 0.20 inch thick or physical dimensions which are roughly spherical and granular with a sixteen (16) mesh size.

Material 30 may illustratively constitute particles of a material designated as UPCo 302 or UPCo 718 by Universal Propulsion Company, Phoenix, Ariz., USA. The particles of the pyrotechnic material 30 may comprise a mixture of different sizes to control the time for the combustion of the combustible material. When used in the quantities required for the inflator 10, the material 30 has properties of providing by-products when partially combusted, or end products when fully combusted, that are environmentally safe and that do not produce offensive or noxious smells when used in the small quantities associated with the inflator 10. The term "environmentally safe" as used herein is meant to indicate that the by-products and end products from the combustion of the pyrotechnic material 30 do not injure the occupant or damage the vehicle or the atmosphere.

The housing 12 may be crimped as at 31 and a ring 34 may be provided at the crimp to seal the housing to a manifold 36. The ring 34 may be affixed to the housing 12 by well-known means other than a crimp. The manifold 36 may be made from a material having a low thermal conductivity and may preferably correspond in composition to the insert 18 and the plug 26. A rupturable diaphragm 38 may be disposed across an opening 40 in the manifold 36 to isolate the opening from the housing 12 until the diaphragm becomes ruptured. It will be appreciated that other means than the diaphragm 38 may be used to isolate the housing 12 from the opening 40, and to provide a communication between the housing and the opening when the gas in the housing expands. For example, a spring-biased pop-off valve may be used instead of the diaphragm 38.

The opening 40 communicates with a conduit 42 extending from the manifold 36. The conduit 42 is preferably disposed fixedly in the manifold 36 as by a pin 44 or may be rotatably affixed as by a snap ring or by other means known in the art. Alternatively, the conduit 42 may be capable of a relative rotation about its axis to assist in providing the most desirable position for inflating an inflatable belt portion 104 (FIG. 4) as the inflatable belt portion passes over the occupant's body. The conduit 42 communicates with the inflatable belt portion 104 (FIG. 4). It will be appreciated that the conduit 42 may be omitted if the opening 40 is intended to communicate directly with the inflatable belt portion 104, such as when the inflator is disposed within the inflatable belt portion (FIG. 21).

When a collision involving the vehicle occurs, an electrical signal passes through the connector pins 24 to the bridge wire 28. This may be accomplished in a manner well known in the art. The bridge wire 28 then becomes heated to ignite the first firing compound 29 which in turn ignites particles of the combustible material 30. The frangible container 32 becomes opened or ruptured by the heat generated from the combustion of the particles of the combustible material 30.

Rupture of the container 32 occurs after a relatively short period of time such as approximately one millisecond (1 ms). After the rupture of the container 32, the partially combusted particles of the pyrotechnic material 30 pass into the housing 12 where such particles continue to combust. This combustion occurs for a relatively short period of time such as approximately two to five milliseconds (2–5 ms). As shown schematically in FIG. 2, the particles of the pyrotechnic material travel in a direction away from the container 32 toward the opening 40 and combust as they travel in this direction. This causes the particles of the pyrotechnic material 30 to diminish in size as they travel from the container 32 toward the opening 40.

Furthermore, the combustion of the particles of the pyrotechnic material 30 in the housing 12 causes the heat generated by such combustion to be transferred directly and thermally to the molecules of the gas in the housing 12 without substantial contact with the housing 12, the end plug 18 and the manifold 36. The housing 12, the container 32, the end plug 18 and the manifold 36 present low thermal conductivity surfaces to interface with the heated gas, thereby causing the heat liberated from the combustion of the pyrotechnic material to be utilized effectively only to heat and expand such gas.

As previously indicated, the gas in the housing 12 is preferably nitrogen, helium or argon. All limit chemical reaction between the pyrotechnic material 30, or any by-products or end products resulting from the combustion of such pyrotechnic material, and such gas. Of the inert gases, argon is preferred because it has a low thermal conductivity. As a result, a substantial portion of the heat generated by the combustion of the particles of the pyrotechnic material 30 is trapped within the molecules of the argon gas. This heat is used to raise the temperature of the molecules of the argon gas in the housing 12. It expands the argon gas in the housing and increases the pressure of the argon gas against the diaphragm 38.

The frangible container 32 and the housing 12 also co-operate in maximizing the temperature increase of the gas in the housing 12 as a result of the heat generated by the particulate combustion. The housing 12 and the container 32 are made from low thermal conductivity materials, at least on the surfaces in contact with the gas. Such materials may be ceramics, rubber coatings, polyethylene coatings and the like. These materials have relatively low thermal conductivities as compared to relatively high thermal conductivity of materials such as steel or aluminum that may be used for the structure of housing 12 and the container 32.

The housing 12 and the container 32 also do not absorb any significant amount of the generated heat because they are exposed to high temperatures only for relatively short periods of time of approximately ten milliseconds (10 ms) or less. This is in contrast to most previously known inflators that function at such elevated temperatures for approximately thirty to sixty milliseconds (30–60 ms). During such relatively extended periods of time, significant heat is transferred to the members forming such inflators.

When the gas has expanded sufficiently in the housing 12, the diaphragm 38 breaks and the gas expands through the opening 40 and the conduit 42. The conduit 42 may be optional. By eliminating the conduit 42, the heated gas is transferred directly through the opening 40 to the inflatable belt portion 104. The area of the diaphragm 38 and the cross section areas of the opening 40 and the conduit 42 may be selected to control the time for the rupture of the diaphragm 38 and the flow of the gas through the opening and the conduit into the inflatable belt portion 104. The particular composition of the pyrotechnic material 30 and the relative sizes of the different particles in such material also control the time within which the gas is to be heated within the container 32, and accordingly controls the time for the gas to flow into the inflatable belt portion 104.

The gas flowing through the conduit 42 passes into an inflatable member such as the inflatable shoulder belt portion 104 which may be made from a suitable material such as nylon or polyester and may be included in a unitary belt generally indicated at 100 (FIGS. 3 and 4). The unitary belt 100 is adapted to be disposed in a vehicle generally indicated at 102. The unitary belt 100 is constructed to protect an occupant in the event of a collision involving the vehicle 102. As illustrated in FIGS. 3 and 4, the inflatable belt portion 104 of the unitary belt 100 is attached at its upper end to a support structure such as a pillar 106 which is disposed at the side of the vehicle 102 and above a seat 108 which holds the occupant. The pillar 106 is disposed to the rear of a vehicle door 10 through which the front seat occupant enters and exits. The support structure may alternately constitute any other suitable portion of the vehicle. For example, the support structure may constitute a flange on the inner surface of the roof portion when the inflatable belt portion 104 protects an occupant in the rear seat of the vehicle. As illustrated in FIG. 21, the support structure may constitute a structural seat affixed to a structural floor or frame of the vehicle.

There are numerous ways to provide and position the inflator. The inflator 10 shown in FIG. 3 is preferably disposed at the upper end of the inflatable belt portion 104. When the inflatable belt portion 104 is attached to the pillar 106, this attachment may be at the upper end of the pillar 106. The inflatable belt portion 104 may be preferably integrated between a decorative fascia with the standard shoulder belt adjustment mechanism enabling the upper position of the inflatable belt portion to fit most favorably the full range of occupants. the inflatable belt portion 104 is preferably disposed above the occupant's shoulder and above the occupant's neck and approximately at a horizontal level approximating the occupant's cheek (left cheek if the occupant is the driver).

Alternatively, the inflator may be installed into the webbing and clamped into position away from the largest inflated diameter section of the inflatable belt portion. An embodiment of this configuration is illustrated in FIG. 21. As a further alternative, the inflator may be positioned externally to the inflatable portion of the belt and a port provided in the belt that is operably connected to the inflator as shown in FIG. 4. The port may be at the end of the inflatable belt portion or along the length thereof.

Figure 6:
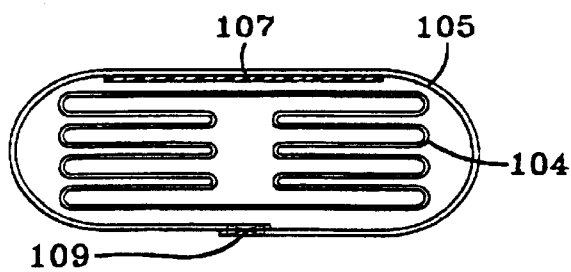
FIG. 6 is a fragmentary sectional view taken substantially on the line 6—6 of FIG. 5 and shows in additional detail the stitching attaching the inflatable belt portion and the lap belt portion to form the unitary belt, as well as the folding of the inflatable belt portion to produce a minimal stress on the inflatable belt portion when the inflatable belt portion becomes inflated.

The inflatable belt portion 104 may be folded in a manner as shown in FIG. 6. As shown in FIG. 6, the inflatable belt portion 104 is provided with a pair of opposed wall portions 104a and 104b laterally displaced from each other. Each of the wall portions 104a and 104b extends in a zigzag configuration from the lateral extremity of such wall portion to a position intermediate the lateral distance between the lateral extremities of such wall portions. This relationship enhances the speed at which the inflatable belt portion 104 in the embodiment shown in FIGS. 3, 4 and 8 can be inflated downwardly from the top of the inflatable belt portion across the chest of the occupant. It also enhances the uniformity in the inflation downwardly of the inflatable belt portion 104. In like manner, the inflatable lap belt portion 160 shown in FIG. 21 is preferably folded to enhance the speed and uniformity of the inflation away from the gas generator and across the lap of the occupant.

A cover 105 (FIG. 9) preferably envelops the inflatable belt portion 104. The cover 105 may be formed from a suitable material such as polyester and may be provided with a color matching the decor of the interior of the vehicle 102. The cover 105 may be formed from a single piece of material attached at its opposite ends as by stitching 109. The stitching 109 may be disposed to face the body of the occupant so that it is not visible to other occupants in the vehicle. The cover 105 becomes separated progressively from the inflatable belt portion 104 as the inflatable belt portion becomes inflated. Preferably a stiffener 107 is disposed within the cover 105 against the inflatable belt portion 104 to prevent the inflatable belt portion 104 from twisting so that the inflatable belt portion is in a flattened configuration prior to inflation.

The cover 105 provides several advantages. It prevents the inflatable belt portion 104 from becoming degraded as from ultraviolet light. It also prevents the inflatable belt portion 104 from becoming degraded as from chafing against the chest of the occupant. It additionally holds the inflatable belt portion 104 to a consistent initial minimal volume and holds the folds of the inflatable belt portion to provide a consistent unfolding of the belt portion during its inflation. It also reduces the stress on the inflatable belt portion 104 as it becomes inflated. The stiffener 107 also assists in retaining the folds of the inflatable belt portion 104 to provide a consistent unfolding of the belt portion.

Figure 14:
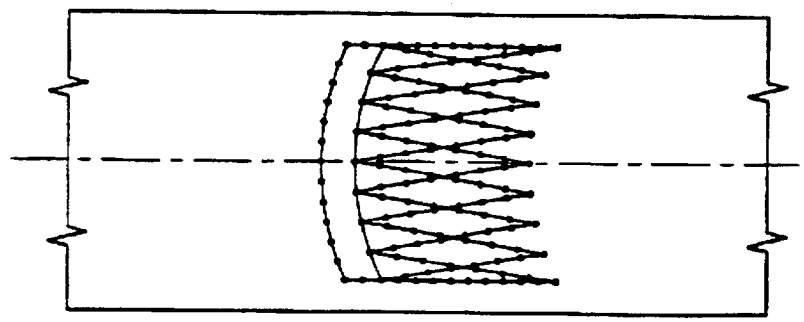
FIG. 14 is a stitching pattern for joinder of the inflatable belt portion and another belt portion to form a unitary belt.
Figure 19:
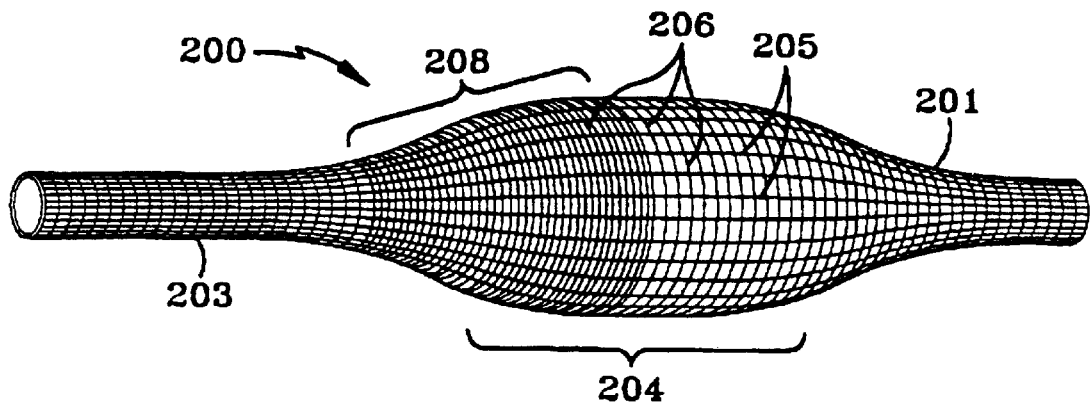
FIG. 19 is a side elevational view of a seamless inflatable textile (shown in its inflated state) of varying diameter.
Figure 20:
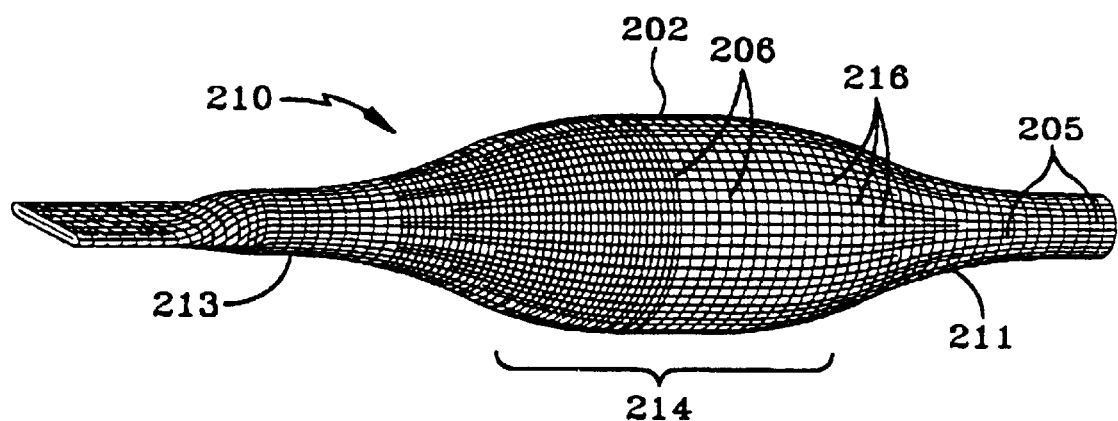
FIG. 20 is a side elevational view of a seamless inflatable textile (shown in its inflated state) for an inflatable belt system.
Figure 22:
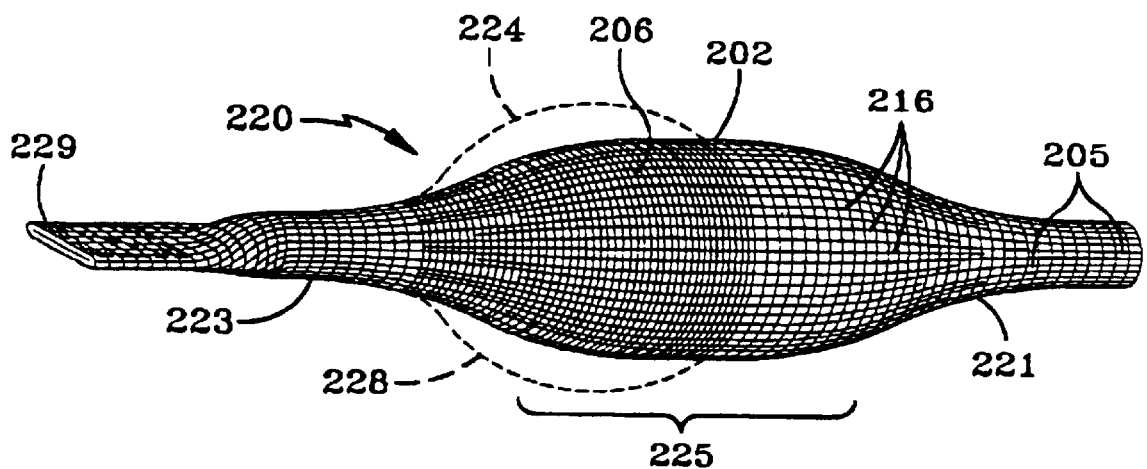
FIG. 22 is a side elevational view of a seamless inflatable textile (shown in its inflated state) for an inflatable belt system, in solid lines at normal inflation pressure, and in dashed lines after exposure to excess internal gas pressure.

The inflatable shoulder belt portion 104 extends diagonally (at a transverse angle) downwardly to a position near, but above, the occupant's lap at the inner or inboard side of the occupant's seat 108. In this diagonal or transverse configuration, the inflatable belt portion 104 crosses the occupant's chest. As shown in the embodiment illustrated in FIGS. 5 and 7, at the lower position, the bottom of the lower end of the inflatable belt portion 104 is suitably connected to a standard seat belt webbing material that forms a lap belt portion 112. This may be accomplished by stitching with a reinforcing stitch known as a boxed-X pattern stitch (FIGS. 5 and 7), although other stitches can be used, for example, a curved nine-point diamond pattern stitch (FIG. 14). The lap belt portion 112 may be made from a suitable material such as nylon or polyester. The construction of the lap belt portion 112 may correspond to the construction of the lap belts now in use. The inflatable shoulder belt portion 104 and the lap belt portion 112 may be considered to form a unitary belt. Alternatively, in the embodiment shown in FIG. 8, the inflatable shoulder belt portion 104 and the lap belt portion 112 are integrally formed as by weaving a textile structure as shown in FIGS. 19, 20 or 22. As shown in FIG. 19, the integrally woven lap belt portion is hollow and inflatable. As shown in FIGS. 20 and 22, the integrally woven lap belt portion is flat and not hollow and inflatable. Alternatively, the inflatable belt portion may be attached by appropriate stitching to a continuation of a tubular textile cover material.

Figure 8:
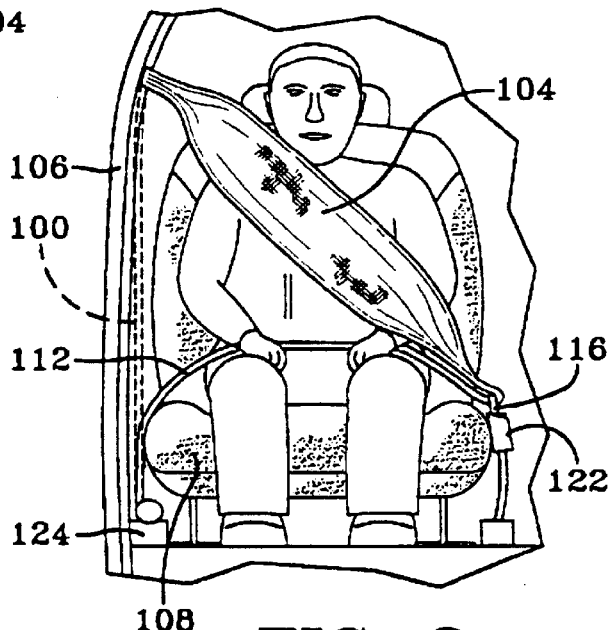
FIG. 8 is a front elevational view of a seated occupant and shows the unitary belt, including the inflatable shoulder belt portion and the lap belt portion, in solid lines with the inflatable belt portion and the lap belt portion restraining the occupant, while showing the inflatable belt portion in broken lines with the inflatable belt portion and the lap belt portion in a non-restraining stowed position.

At a position near, but above, the occupant's lap, the lap belt portion 1 12 extends through a D-ring coupling member 116 (FIG. 8). A D-ring coupling member such as the D-ring coupling member 116 is well known in the art. The D-ring coupling member 116 has an opening 115 (FIG. 5) through which the lap belt portion 112 extends to change the direction of the lap belt portion 112 from a downward and transverse direction to substantially a horizontal direction (FIG. 8) in which the lap belt portion extends across the occupant's lap. At its inboard end, the lap belt portion 112 is attached to the D-ring coupling member 116 (FIG. 3) that is removably coupled to a retainer 122 in the vehicle. The construction of the D-ring coupling member 116 and the retainer 122 is well known in the art for use in vehicles such as automobiles now on the market.

In the embodiment shown in FIG. 21, the 2-point lap belt is affixed to a coupling member 116 capable of being detachably attached to retainer 122. The construction of the D-ring coupling member 116 and the retainer 122 is well known in the art for use in vehicles such as automobiles now on the market.

The inflatable shoulder belt portion 104 becomes inflated downwardly from the top of the belt when the inflator 10 is actuated. This is advantageous because it is desirable to exclude the mounting of the inflator 10 in undesirable locations such as the buckle and retractor locations due to their attendant gas and electrical connection deficiencies. Furthermore, the inflation of the inflatable shoulder belt portion 104 downwardly from the top of the inflatable belt portion facilitates protection initially of the head, neck and chest of the occupant. This is advantageous because an injury to the occupant's head, neck and chest can be life ending but an injury to the occupant's lower extremities such as the occupant's knees and ankles is generally at worst crippling. Furthermore, the case of a side impact of the vehicle 102, the time available for interspacing the protective cushion between the head and the interior of the side of the vehicle in a collision against the side of the vehicle is relatively short (e.g. 10–15 milliseconds). The downward inflation of the inflatable shoulder belt portion 104 from the top of the inflatable belt portion is particularly beneficial in such situations.

As will be seen from FIG. 4, the inflatable shoulder belt portion 104, when inflated, protects the occupant's neck and head. This controls the occupant's head motion by providing an inflated cushion that supports the occupant's head from beneath the chin and prevents the occupant's head from rotating violently in a forward direction. When the occupant's head rotates violently forward, as in the prior art, accompanied by a forward movement of the occupant's chest, the occupant's head may impinge against the dashboard or instrument panel or steering wheel (when the occupant is in a front seat) unless adequate restraint against this movement is provided as in this invention. Furthermore, the occupant's neck may be severely strained, as in the prior art, as a result of the violent jerk imparted downwardly to the neck at the time of the collision. It will be appreciated that the inflatable shoulder belt portion of this invention also protects the occupant's chest and legs. When the occupant is sitting in the rear seat, the occupant's neck and head are protected in this manner by the inflatable belt portion of this invention from moving against the rear of the front seat.

When the inflatable shoulder belt portion 104 becomes inflated, its effective length is shortened as the path length of the inflated material in the inflatable belt portion is forced outwardly. This in turn draws the webbing portion of the lap belt portion 112 through the D-ring portion of the coupling member 116 when the coupling member is coupled to the retainer 122. This causes the lap belt portion 112 to become tightened against the lap of the occupant. The lap belt portion 112, when tightened by the inflation of the inflatable belt portion 104, restricts the movements of the occupant's lower torso. This inhibits the occupant's lower body from sliding forwardly and accordingly significantly mitigates the chance that the occupant's knees and feet will be injured. It also positions occupant's upper torso so that the occupant's head and chest can be most effectively restrained. In like manner, when the inflatable lap belt portion 160 (FIG. 21) becomes inflated, its length is shortened.

The amount of the pyrotechnic material 30 in the container 32 is so small and the inflation of the inflatable belt portion 104 is so fast that the temperature of the inflatable belt portion increases only a minimal amount. For example, the temperature rise of the inflatable belt portion 104, 160 as a result of the inflation of such belt portion may be approximately only 7 degrees Fahrenheit. This prevents the occupant from being burned such as sometimes occurs in the inflatable restraints of the prior art.

Figure 5:
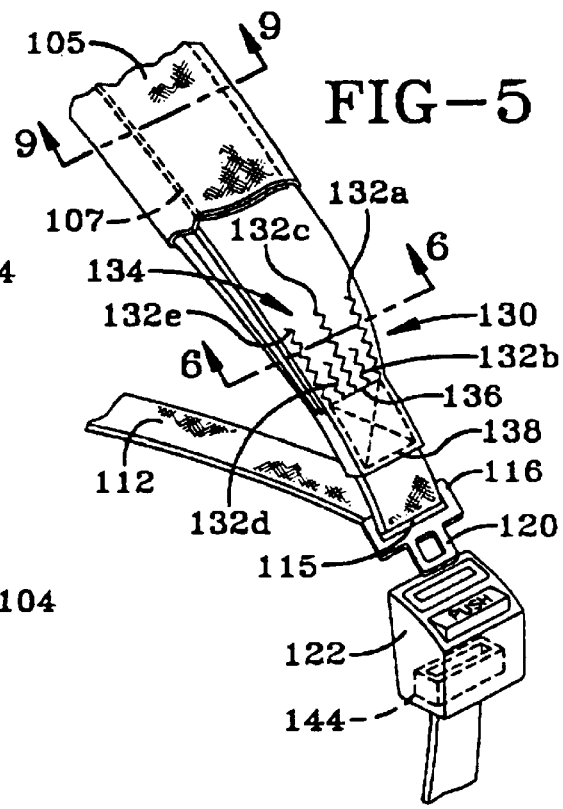
FIG. 5 is a fragmentary perspective view of the unitary belt, including the inflatable shoulder belt portion and the lap belt portion, illustrating the attachment of the inflatable belt portion and the lap belt portion by an arrangement of stitches adapted for dissipating the stresses produced in the inflatable belt portion when the inflatable belt portion becomes inflated.
Figure 7:
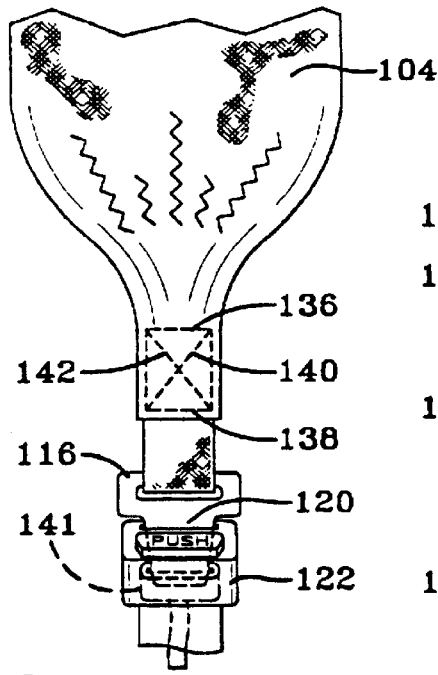
FIG. 7 is a fragmentary view showing in additional detail the stitching also shown in FIGS. 5 and 6 and illustrating the use of the seat belt stitching in the area where the inflatable belt portion remains folded even after inflation, this stitching being used to transmit loads from the inflatable belt portion to the lap belt portion.

As shown in FIGS. 5 and 6, the inflatable belt portion 104 is relatively narrow before inflation. This results from the zigzag folded configuration of each of the wall portions 104a and 104b from the lateral extremity of such wall portion to a position intermediate the wall portions. This is shown in FIGS. 5 and 6. However, when the inflatable belt portion 104 becomes inflated, it expands so that the lateral distance between the wall portions 104a and 104b becomes considerably increased. This is best seen in FIGS. 7 and 8. This is advantageous since the unit force imposed upon the occupant's body at any position on the chest, neck and head of the occupant's body is considerably reduced by the significant increase in the area of contact of the inflatable belt portion 104 against the occupant's body. The inflatable lap belt portion 160 (FIG. 21) is likewise preferably folded before inflation.

The lap belt portion 112 is adapted to be coupled to a retractor 124 fixedly disposed in the vehicle near the floor of the vehicle. Alternatively, the retractor 124 may be affixed to the floor of the vehicle or the seat. The retractor 124 may be constructed in a conventional manner well known in the art to dispose (e.g. wind) the lap belt portion 112 on the retractor to allow the unwinding of the lap belt portion from the retractor. Suitable retractors are used with lap belts in vehicles now on the market. For example, the retractor 124 may constitute a Webbing Velocity Sensitive Retractor (Part No. 501580-4031) available from Am-Safe, Inc. of Phoenix, Ariz., USA. This retractor is incorporated by reference in this application.

The retractor 124 prevents the lap belt portion 12 from being extended upon the occurrence of a collision involving the vehicle 102. Since the lap belt portion 112 cannot be extended at such a time, the inflation of the inflatable shoulder belt portion 104 produces a tightening of the lap belt portion 12 against the lap of the occupant. At the same time, the inflatable shoulder belt portion 104 becomes disposed adjacent to the occupant's head, neck and chest to substantially restrain movement of these portions of the occupant's body.

When the coupling member 116 (FIGS. 3, 5 and 8) is detached from the retainer 122 in a manner well known in the art, the retractor 124 causes the lap belt portion 104 to become disposed (e.g., wound) on the retractor. As a result, the inflatable belt portion 104 becomes disposed downwardly to a position adjacent, but to the rear of, the seat 108. This is shown in broken lines in FIG. 8. In the instance where the upper end of the inflatable belt portion 104 is attached to the pillar 106, the occupant is able to enter and exit the vehicle through the front door without any obstruction from any portion of the inflatable belt 104 since the pillar is to the rear of the front door. As shown in FIG. 21, when the coupling member 116 is detached from the retainer 122 in a manner well known in the art, the retractor 124 mounted under the seat 108 causes the inflatable lap belt portion 160 to be drawn across the seat toward roller guide 103.

As will be seen, the inflatable belt assembly 100 is advantageous because it can be fitted or retrofitted in a vehicle without having to alter any of the components or sub-assemblies in the vehicle. The unitary belt 100 can be provided for the occupant of the drivers seat, the occupant of the other front seat and the occupants in the rear seats. The unitary belt 100 is provided as an integral assembly in each of these seats, in part because the inflator 10 for inflating the inflatable belt portion 104 is disposed in juxtaposition to such inflatable belt portion.

As will be appreciated from the above discussion, the inflatable belt portion 104 becomes inflated almost instantaneously after the occurrence of a collision involving the vehicle. As the inflation reaches the bottom of the inflatable belt portion 104 (the end distal from the inflator), it exerts a large stress upon the inflatable belt portion 104, which is believed to be particularly high at the end portion that is last to be filled with gas. While the inventors do not wish to be held to a single theory, it is believed that this stress is caused by a pulse or shock wave in the inflation gas due to the high velocity at which it enters and fills the inflatable belt portion. In the construction illustrated in FIGS. 5 and 7, this corresponds to the bottom end of the inflatable belt portion 104, which is also the position of thickness discontinuity between the relatively thin fabric section of the inflatable belt portion 104 and the thicker portion of the webbing of the standard seat belt construction as represented by the lap belt portion 112. This webbing constitutes the material of the lap belt portion 112. The position of the thickness discontinuity is at the position where the inflatable belt portion 112 is attached to the lap belt portion 112.

Upon inflation, the large stress at the position of the thickness discontinuity between the inflatable belt portion 104 and the lap belt portion 112 may tend to tear the relatively thin material of the inflatable belt portion 104 and separate the inflatable belt portion 104 from the lap belt portion 112 if measures were not provided to prevent this from occurring. If the inflatable belt portion 104 became fully separated from the inflatable belt portion 112, the desirable effects of inflating the inflatable belt portion 104 would be lost from the standpoint of protecting the occupant.

One way for resolving the problem discussed in the previous two paragraphs is a stitching arrangement as generally indicated at 130 in FIGS. 5–7. The stitching arrangement includes pluralities 132a, 132b, 132c, 132d and 132e of stitches 134 arranged in a saw-tooth or zigzag pattern that extends along the end of the belt portion 104 or even into belt portion 112. As best seen in FIG. 5, the pluralities 132a, 132c and 132e of the stitches 134 have a greater length than the pluralities 132b and 132d of the stitches 134. The pluralities 132b and 132d of the stitches 134 are preferably disposed respectively between the pluralities 132a and 132c of the stitches 134 and between the pluralities 132c and 132e of the stitches 134. It will be appreciated that the pluralities of the stitches 134 may have the same or variable lengths. When the inflatable belt portion 104 becomes inflated downwardly from the upper position of such belt portion, the force produced on the thin inflatable cloth constituting the inflatable belt portion 104 at the bottom end of such inflatable belt portion is attenuated as it acts upon progressive ones of the stitches 134 in each of the pluralities 132a, 132b, 132c, 132d and 132e. This action loads each stitch progressively to the point of separation and thereby provides for a separation of such stitch. This may be illustratively seen in FIG. 7. However, this stitching arrangement is not required in all embodiments of inflatable belt portions; some embodiments exhibit sufficient inherent strength to resist these stresses.

The large inflation-induced stress at the position of the end of the tubular inflatable belt portion 104 where it is joined to the lap belt portion 112 can alternatively be addressed by provision of the lower end of the inflatable belt portion 104 with an elastomeric reinforcement where it is joined to the webbing forming lap belt portion 112. The folds adjacent the lower end of the inflatable belt portion 104 are coated and adhered to one another with an elastomeric material such as self-curing silicone. The elastomeric material progressively tears away as inflation proceeds, thereby reducing the load on the cloth of the inflatable belt portion below that at which the cloth would rupture due to the inflation gas pulse. However, this elastomeric or silicone reinforcement is not required in all embodiments of continuous inflatable belt portions; some embodiments exhibit sufficient inherent strength to resist these stresses. In certain embodiments, such an elastomeric reinforcement can be used in combination with other means to resist this large stress.

At a position removed in the inflatable belt 104 from the pluralities 132a, 132b, 132d, 132d and 132e of the stitches 134, additional stitches 136 and 138 (FIGS. 6 and 7) are disposed laterally across the widths of the overlapping inflatable belt portion 104 and the lap belt portion 112 at spaced positions along the overlapping lengths of the inflatable belt portion and the lap belt portion. Additional stitches extend diagonally from each lateral edge of the stitches 136 to the other lateral edge of the stitches 138 to define a crisscross pattern. Such diagonal stitches are indicated at 140 and 142. These stitches serve to transmit the loads carried by one lateral edge of the inflatable belt portion 104 along the lateral dimensions of the inflatable belt portion 104 and the lap belt portion 112 to the other lateral edge of the inflatable belt portion. The combination of stitches 136, 138, 140 and 142 may be referred to as a boxed-X stitch.

The large stress at the lower end of the inflatable belt portion 104 can alternatively be addressed by provision of the lower end of the inflatable belt portion 104 as a seamless hollow inflatable member. In certain preferred embodiments, the one-piece tapered woven textile maintains continuity as the seamless fabric tapers from a larger size to a smaller size. As the size of the hollow textile becomes smaller, the warp ends per unit of width (weft direction of the textile) increase, thereby inherently increasing the rupture resistance at the end of the tapered tubular textile. Also, in certain preferred embodiments, selected wefts and optionally selected warps may be formed of filamentary material that is only partially oriented, that is, intentionally not fully drawn and heat set at the time of manufacture. In this latter instance, inflation of the hollow inflatable member causes these plastically extensible weft ends and warp ends to be further drawn in the event that the stress due to internal inflation pressure exceeds a threshold value, thereby dissipating the inflation gas energy and pressure that might otherwise rupture the inflatable belt portion 104 or its (sewn) connection to the lap belt portion 112. Selective placement of plastically extensible warp ends can be used to assist in inflation and expansion of the inflatable belt portion away from the body of the occupant. As such partially oriented fibrous member is drawn, it increases in orientation and strength. In certain applications, use of partially oriented plastically extensible weft members permits manufacture of a tapered tubular woven inflatable belt portion in which the large diameter portion and the small diameter portions are of the same or nearly the same diameter as woven and expand to different diameters when inflated. This simplifies manufacture of the seamless hollow textile for the inflatable belt portion and enables provision of an inflatable belt portion that is lighter and less voluminous in its uninflated state as compared to prior inflatable restraint belts.

At the conclusion of the collision event, it is preferable that the inflatable belt portion deflate at least partially to facilitate egress from the vehicle. This may be accomplished through diffusion of the inflation gas through the fabric of the inflatable belt portion 104, 160 which may be designed to have a specific porosity, or through one or more vents provided in the inflatable belt portion 104, 160. In all cases, the inflation system provides sufficient gas before and during the collision event to inflate and maintain inflation of the inflatable belt portion 104, 160 sufficient to protect the occupant and when the inflator has exhausted preferably allows deflation in a short time of several seconds.

Figure 10:
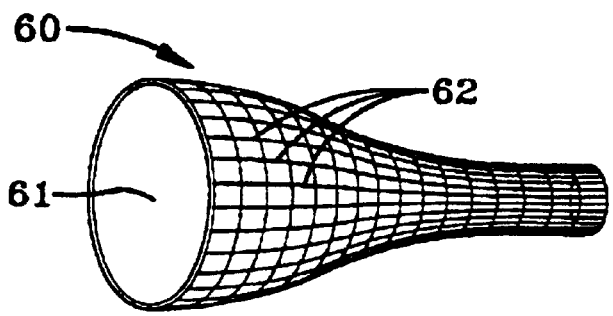
FIG. 10 is a side elevational view of a hollow textile having a cavity of varying diameter.
Figure 11:
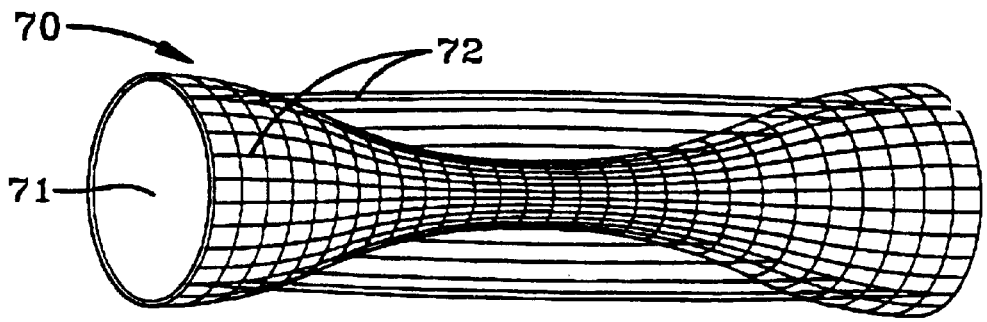
FIG. 11 is a side elevational view of a hollow textile having a cavity of varying diameter including warp members that float over the region of smaller diameter.
Figure 12:
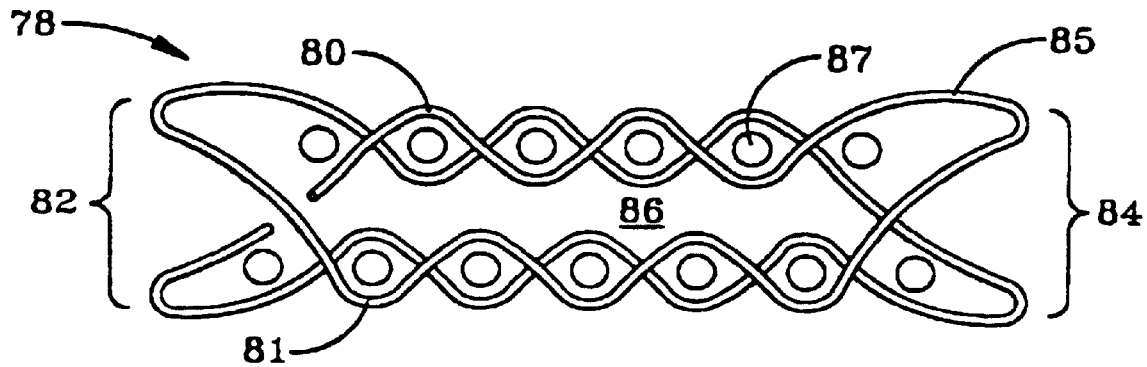
FIG. 12 is an end view schematically depicting production of a hollow textile having a cavity.

Manufacture of Tapered Seamless Textile Structure for use in Inflatable Belt Portion Suitable seamless hollow textiles for use in inflatable belt portion 104, 160 made be made as follows. Suitable seamless tapered textiles 60, 70 such as are shown in FIG. 10 and FIG. 11 respectively having a cavity 61, 71 of changing size or diameter may be manufactured by weaving a tubular shape as a pair of two-dimensional, layered surfaces that are joined at their edges as shown in FIG. 12. A tube 78 is woven so as to produce two textile layers 80, 81 lying over each other in which only the edge regions 82, 84 are woven together. For this, the shuttle-weaving technology is especially advantageous, because the weft 85 is therefore uncut, alternatingly woven about warps 87 into the upper textile layer 80 and the lower textile layer 81 and consequently no seam locations form within the range of the woven tubular textile. Also, automatic needle weaving machines like those manufactured by Jakob Muller of Frick, Switzerland may be used, though the weft member must be held at the selvedge of the textile, which results in a more or less distinct bulge in the warp direction of the textile.

Previously known processes for the weaving of tubular structures generate a constant textile width. The diameter of the woven cavity, and thus the woven tube, is therefore constant. In certain embodiments of the invention having an inflatable belt portion, however, a hollow textile is preferred where a more or less strongly tapering diameter or where a constant conicity between two different diameters is desired. Tapered cavity textile structures could be produced until now only by a spiral wrapping (filament winding) process or by an interlacing (braiding) process. The spiral wrapping (filament winding) process is very time consuming and costly and is limited by the danger of movement of the yarn members on the developing core. The interlacing (braiding) process cannot lay yarn members in the circumferential direction of a tube. Because the braid yarn members are not laid in the circumferential direction, their full strength is not available to the resist hoop (circumferential direction) stress which exists when the textile structure is inflated. The cavity size can not be changed in a continuous braiding process, except by passing a mandrel of the desired pattern through the braiding machine, with the attendant difficulty of subsequently removing the mandrel.

The goal of finding a woven textile structure that forms a cavity, e.g. a tubular structure, where the fibrous members proceed in axial and in circumferential directions, and where the cavity diameter itself increases or reduces in the direction of the warp members may be achieved as described herein below.

In one embodiment for changing the cavity diameter, as shown in FIG. 10, the spacing of the warps 62 from one another is contracted as well as spread apart during manufacture of the textile 60. The overall number of the warps thus remains constant in the textile 60. The textile width changes as the spacing of the warps 62 changes and thus does the diameter of the woven cavity 61.

Figure 13:
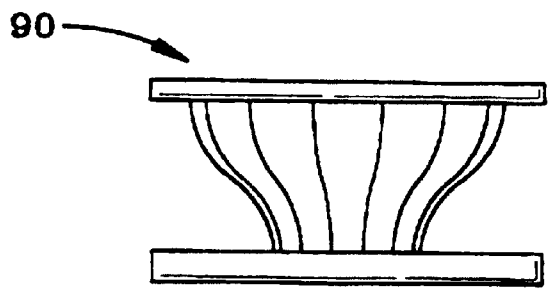
FIG. 13 is a fan-shaped weaving guide for spreading and contracting the spacing of the warp members.

In another embodiment for changing of the warp width and thus the cavity width of the textile, as shown in FIG. 11, warps 72 are removed or added as weaving of the textile 70 proceeds. Individual or groups of warps are periodically left behind to remain in the high or low compartment position of the weaving apparatus while the cavity 71 is being woven. These warps 72 float for a distance outside of the surface of the woven structure as shown in FIG. 11. At such sites, where these warps 72 are tied in again into the textile, the textile width increases and thus the woven cavity 71 or tube diameter likewise increases. For this manufacturing process, it is advantageous to use a jacquard machine with single warp member control. It is also advantageous to use for the support of the changing textile width a fan-like weaving reed 90 as shown in FIG. 13 together with a mechanism which catches and positions the selvedges of the fabric, or other different equipment that gives the warps the desired lateral spacing.

Conventional shuttle weaving technology is especially advantageous for the production of the seamless tubular members having variable warp widths. According to conventional weaving technology, the bobbin of weft material and shuttle are together conveyed through the weaving surface as shown in FIG. 12 and, because the weft member 85 is not severed at the selvedge but is returned and carried back in the following layer, selvedges 82, 84 are formed. The weft member 85 is returned alternatingly in the upper textile layer 80 and the lower textile layer 81. The prepared textile 78 has thus a cavity 86 and tubular structure without a seam location since the upper layer 80 turns at the selvedges 82, 84 without interruption of the lower layer 81 turns. Combination of this type of fabric production with one of the proposed warp lateral spacing or width variations provides a seamless woven tube with different diameters.

As an alternative or auxiliary method of manufacture, the width or size of the textile cavity 61, 71, 86 respectively shown in FIGS. 10, 11, 12 may be reduced by increasing the weft member tension which leads to a constriction of the warp members and thus to a changed textile width. It is advantageous in this instance to have an adjustable weft yarn brake that at certain times brakes the weft yarn more and at other times less.

Figure 15:
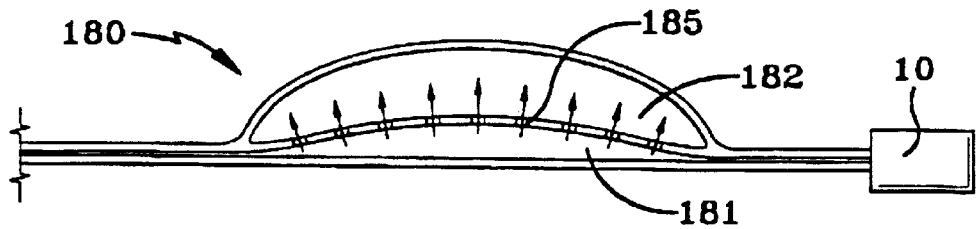
FIG. 15 is a side elevational cutaway view of an inflatable belt including a three-layer seamless hollow textile structure.
Figure 16:
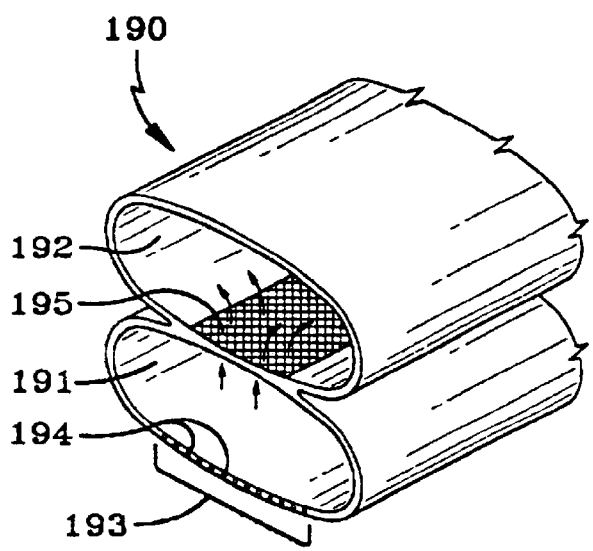
FIG. 16 is fragmentary perspective view of an inflatable belt including a three-layer seamless tubular textile structure.

In another embodiment of a seamless tubular textile structure, more than two layers can be woven over each other, e.g. three as shown in FIGS. 15 and 16. These embodiments therefore result in two more superposed cavities (181, 182 of textile 180 in FIG. 15 and 191, 192 of textile 190 in FIG. 16) or chambers that proceed in the warp direction. The proposed width-changing techniques described herein also therefore lead to the narrowing or widening of the cavities of the seamless multiple cavity tubular textile 180, 190. For use in the inflatable belt portion 104, 160 one or more of the cavities could be connected to the source of inflation gas. As shown in FIG. 16, at least a portion of one of the cavities could be formed from warp members of greater strength than the warp members of the other one of the cavities to provide greater structural capacity. As shown in FIG. 16, portion 193 of the bottom of the bottom cavity 191 is formed of warps 194 that are of greater size and strength than the remainder of the warps forming seamless hollow inflatable textile 190. In use in the inflatable seat belt of this invention, the warp members of greater strength are positioned against the body (chest or lap) of the occupant, thereby reducing the stress on the thinner material of the inflatable cavity of the inflatable belt portion at the position of the thickness discontinuity between the inflatable belt portion 104 and the lap belt portion 112. As shown in FIG. 16, the inflatable belt portion includes warp members 194 of greater strength and greater resistance to elongation under an imposed tensile load that are positioned to correspond to the area of the inflatable belt portion which contacts the body (chest or lap) of the occupant, thereby preventing undesired elongation of the unitary belt in a collision in the event that inflation does not occur or the inflatable portion becomes ruptured.

In certain preferred embodiments, such as those shown in FIGS. 15 and 16, the system is configured to cause the lower chamber 181, 191 of the inflatable belt portion to inflate first, and thereafter the inflation gas passes (as indicated by the arrows) from the lower chamber 181, 191 through ports 185 (FIG. 15) or porous section 195 (FIG. 16) in the middle textile layer into the upper chamber 182, 192 to subsequently inflate the upper chamber. In use the lower chamber 181, 191 is positioned adjacent the body of the occupant. Sequential inflation beginning with the lower chamber followed by inflation of the upper chamber serves to more gradually impose a force on the occupant, thereby assisting the occupant to be positioned correctly relative to the seat and the seat belt system as the second chamber is subsequently inflated to more fully protect the occupant. Use of multiple chambers with sequential inflation allows use of a greater overall chamber size without as great a risk of rupture of the inflatable belt portion or injury of the occupant due to sudden expansion of the inflatable belt portion. This is particularly of value where the inflatable belt portion 160 extends across the lap of the occupant, as in an arrangement like that shown in FIG. 21. In use, the chamber 191 positioned in contact with the occupant is first inflated and the remaining chamber 192 or chambers are subsequently inflated, thereby assisting to position the occupant in a preferred upright posture in the event of a collision when the occupant is not sitting upright.

In another embodiment of a seamless tubular textile structure, a vertically adjustable fan-shaped weaving reed or guide 90 like that shown in FIG. 13, or such as is described in WO 96/31643 to Busgen, is employed to assist the narrowing or spreading of the warp yarns. The fan-shaped reed pieces are moved together as a unit so that a vertical shift in weaving reed position causes a narrowing or spreading of the lateral spacing of the warp members. In practice, the fan-shaped reed 90 is positioned dependent on the particular weft in the predetermined textile pattern thereby causing the warp members to become more or less densely packed. A programmed computer or microprocessor may be employed to control the position of the fan-shaped reed. The less densely packed warp members result in a wider textile width, and thus larger cavity size or diameter, and the more densely packed warp members result in a narrower textile width and thus smaller cavity size or diameter.

Figure 23:
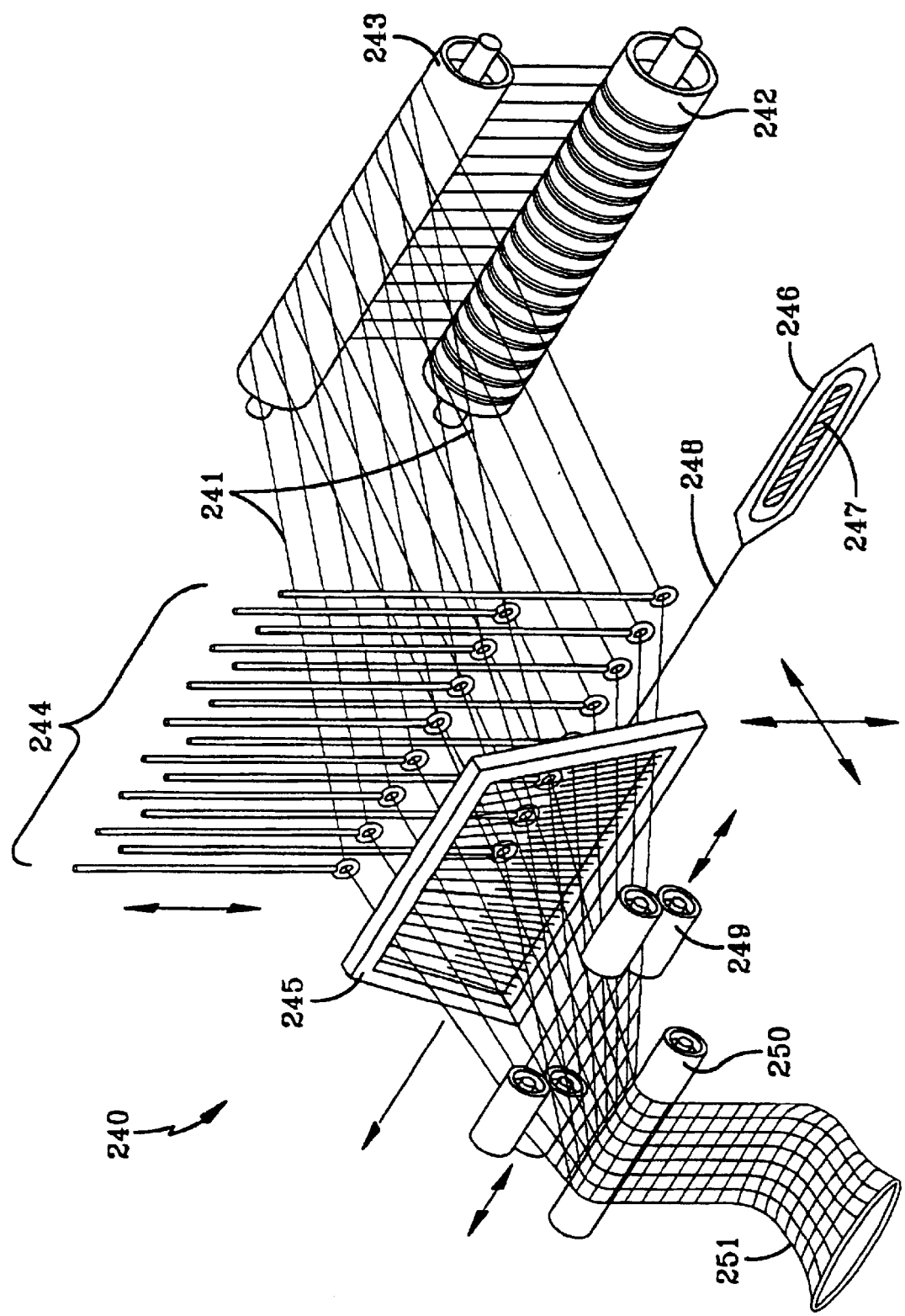
FIG. 23 is a schematic view of an apparatus for weaving a seamless hollow textile structure.

Elements of a suitable weaving apparatus 240 are shown schematically in FIG. 23. The warp yarns 241 are drawn from warp beam 242 over letoff guide roll 243 through the eyes of heddles 244 and fan-shaped weaving reed 245 by takeup roll 250. In practice in the manufacture of a single cavity hollow textile, there are four groups of warp yarns, two for the upper layer of the hollow textile and two for the lower layer of the hollow textile, although only two are observable. The spacing of the warp yarns 241 in the shed is controlled by the position of fan-shaped reed 245 which as shown may be moved upward or downward or toward or away or combinations of these movements relative to the heddles to vary the spacing of the warp yarns 241 as the shuttle 246 containing a bobbin 247 of weft yarn 248 is passed through the shed. The weaving apparatus 240 is equipped with selvedge guides 249 which grip the selvedges of the newly formed hollow textile 251 and guide it to the takeup roll 250. The position of the selvedge roller guides 249 is varied in correspondence to the warp spacing as determined by the position of the fan-shaped reed 245. For simplicity of illustration, the harnesses for vertical movement of the heddles are not shown, as these are well known to those of ordinary skill in the textile art.

In another embodiment of a seamless tubular textile structure, a weaving guide having laterally movable warp guide members (not illustrated) is employed. Alternatively, an actively working adjustment can be used that laterally directs and positions the warp members.

For use in inflatable belt assemblies, seamless hollow or tubular textile structures can be produced as a continuous member of changing cavity size, the pattern being periodically repeated as shown in FIGS. 19, 20 and 22 as desired for the required inflatable belt portion 112, 160, and subsequently severed in the smaller cavity portions to provide a plurality of like inflatable members. Alternatively, individual seamless hollow or tubular textile structures of changing cavity size can be produced one at a time, the weaving pattern being repeated after severance of the preceding completed structure.

In certain embodiments, as shown in FIGS. 20 and 22, the seamless hollow textile structure 200 and 220 respectively is manufactured with plastically extensible filaments 202 (partially oriented yarn) in a predetermined portion of the warp members and weft members. Where such plastically extensible filaments are employed, any excessive stress that would otherwise arise during inflation may be absorbed by drawing of such plastically extensible filaments to produce a larger inflated shape 224 as shown in dashed lines in FIG. 22 in the event that the internal gas pressure exceeds a predetermined threshold value that otherwise might cause tearing of the fabric of the inflatable belt portion. Type N13 nylon available from DuPont having an elongation of 300 or more percent is an example of a plastically extensible filamentary material that can be used. Yarns of different degrees of plastic extensibility may be employed in the manufacture of the hollow textile structure for use in a restraint system of the invention. Unstabilized yarns may be used at weaving in selected or all locations to allow shrinkage in subsequent treatment operations to tighten the weave. In contrast, the remainder of the hollow textile structure is formed of higher tensile yield point yarns that have a much lower elongation capability, e.g. about 20 percent.

As shown in FIG. 19, the seamless hollow textile structure 200, includes first hollow end portion 201 and second hollow end portion 203 that are joined by integral weaving to center portion 204. The number of warps 205 is constant throughout the length of textile structure 200, but the number of wefts 206 per unit of length is greater adjacent end portion 203 than adjacent end portion 201. The wefts in portion 208 are more closely spaced than the wefts in the remainder of the hollow textile structure 200.

As shown in FIG. 20, the seamless hollow textile structure 210, includes first hollow end portion 211 and second hollow end portion 213 that are joined by integral weaving to center portion 214. The number of warps 205 is varied throughout the length of textile structure 210, with additional warps 216 being provided in proportion to the increase in size (circumference) of the hollow textile structure. The number of wefts 206 per unit of length is greater adjacent second end portion 213 than adjacent first end portion 211. The cross-sectional configuration of second end portion 213 changes from a hollow woven to a flat woven construction that is not inflatable as the distance from the center portion 214 increases.

As shown in FIG. 22, the seamless hollow textile structure 220, includes first hollow end portion 221 and second hollow end portion 223 that are joined by integral weaving to center portion 225. The number of warps 205 is varied throughout the length of textile structure 220, with additional warps 216 being provided in proportion to the increase in size (circumference) of the hollow textile structure. The number of wefts 206 per unit of length is greater adjacent second end portion 223 than adjacent first end portion 221. The cross-sectional configuration of second end portion 223 changes from a hollow woven to a flat woven construction 229 that is not inflatable as the distance from the center portion 225 increases. The wefts 206 in portion 228 are more closely spaced than the wefts in the remainder of the hollow textile structure 220, and are formed of plastically extensible yarn 202 that has a greater elongation at breakage than the elongation at breakage of the wefts in the remainder of the hollow textile structure 220.

Figure 17:
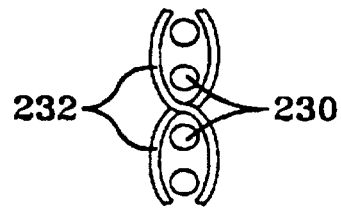
FIG. 17 is a schematic view of a weaving pattern for an inflatable textile structure, the pattern being visible when the textile structure is severed parallel to the warp direction.
Figure 18:
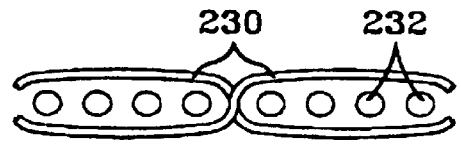
FIG. 18 is a schematic view of a weaving pattern for an inflatable textile structure, the pattern being visible when the textile structure is severed perpendicular to the warp direction.

A suitable tapered seamless tubular textile structure suitable for use in an inflatable belt assembly according to the invention may be of the following parameters. The length of the textile structure for the inflatable belt portion is typically from about 50 to about 75 inches, the width in the narrowest section at each end when flattened is 2.25 inches which corresponds to an inflated diameter in the end portions of about 1.4 inches, and the width in the widest section between the spaced end portions when flattened is about 9 inches which corresponds to an inflated diameter in the largest section of about 5.7 inches. The warps may be formed of a 210 denier, 34 filament, Type 728 nylon available from E. I. duPont de Nemours & Company, Wilmington, Del. (DuPont), USA. According to DuPont, Type 728 nylon yarn with a twist of 3 turns per inch (1t/cm) has an elongation at break of about 21.8 percent. The weft may be formed of 420 denier, 68 filament, Type 743 nylon available from DuPont. According to DuPont, Type 743 nylon yarn with a twist of 3 turns per inch (1t/cm) has an elongation at break of about 19 percent. The textile includes 1276 warp ends spaced around the circumference, although it is believed that the number of warp ends can be increased to about 1400 for improved performance. The textile includes weft members up to a maximum of 71/inch (28/cm), although this number is believed to be greater than is necessary to withstand the hoop stress during inflation. The weave pattern is a variation of a plain weave that is described as a 4×4 filling rib pattern (so called because ribs are produced in the filling direction during weaving). Shown in FIGS. 17 and 18 is another preferred weaving pattern for an inflatable textile structure of the invention. As shown in FIG. 17, the weft ends 230 are paired and as shown in FIG. 18, the warp ends 232 are in groups of four in the textile structure. Following weaving, the textile structure may be scoured to remove any processing oils and sizings, and to improve dyeing and adhesion of a coating, if provided, to improve retention of the inflation gas.

In certain embodiments where the inherent resistance to gas permeability of the fabric of the inflatable belt portion is insufficient to allow the inflated belt portion to retain its inflated configuration for a sufficient time after a collision, a coating is applied to the fabric of the inflatable belt portion to reduce gas permeability relative to that of an uncoated fabric. It is believed that a coating is not required in every application.

Alternatively, a tapered seamless tubular textile structure suitable for use in an inflatable belt assembly according to the invention may be formed as set forth above, except the textile structure is formed of polyester as described hereinafter. The warp member may be formed of 440 denier, 100 filament, Type 52 (low elongation) polyester from DuPont. The weft member may be formed of 440 denier, 100 filament, Type 68 (high tenacity) polyester from DuPont. The weave pattern may be a 4×4 filling rib pattern as described above.

For use in an inflatable seat belt assembly, the seamless tubular textile structure is pleated, e.g. using a "W" fold pattern as shown in FIG. 6 in order to reduce the width to that of typical restraint webbing. The number of pleats is dependent upon the width of the textile structure before pleating and the desired width after pleating. The pleating process may be assisted by insertion of metal strips into the textile structure to facilitate folding of the textile structure to the desired width. When the pleating is complete, the resultant inflatable textile band is pressed with a hot press similar to those that are used to press apparel.

Figure 9:
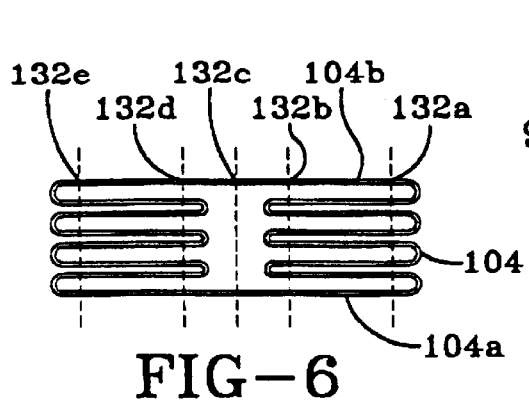
FIG. 9 is a sectional view of the inflatable belt portion and a cover enveloping the inflatable belt portion and is taken substantially on the line 9—9 of FIG. 5.

The pleated textile structure is then covered with a tubular cover that is weaker in a direction corresponding to the weft direction of its associated inflatable (pleated) portion so that upon inflation the cover tears away and allows the inflatable structure to inflate to full dimension. The cover may be color coordinated for aesthetic purposes. There are numerous ways to accomplish controlled tearing away of the cover during inflation of the inflatable belt portion 104, 160. The cover can be sewn from a strip of fabric that is joined at its ends as by stitching 109 to encapsulate the inflatable belt portion as shown in FIG. 9. Suitable fabric for a sewn cover 105 is available from Precision Fabrics Group, Greensboro, N.C., as style number 54516. Alternatively, the cover can be woven as a tubular member that is slipped over the pleated inflatable belt portion. A suitable woven tubular cover is available from Breed of Knoxville, Tenn. The woven tubular cover may be designed and manufactured to be frangible, for example, through use of weaker yarns at selected locations or by inducing weakness by mechanical action or by a laser. Upon inflation of the inflatable belt portion 104, the cover cleaves along the predetermined weakness thereby allowing the inflatable to progressively inflate to its full dimension.

The inflatable belt portion 104 may be protected against the influx of the inflation gas, particularly if the gas is hot enough to degrade the fabric of inflatable belt portion 104, with a fabric shield 150 (dashed lines in FIG. 4) that is attached to the gas outlet of the inflator 10 and inserted into the inflatable belt portion. The concentrically arranged fabric shield 150 and hollow belt portion 104 may be affixed to the gas outlet of the inflator 10 as by a clamp or swaged metallic ring. The internal fabric shield 150 may be formed of silicone-coated 630 denier nylon fabric available from Milliken. Company of Spartanburg, S.C. that is woven into a tube of about 1.75 inch diameter by about 37 inches long having a end 151 that is configured to be attached to the gas inlet. The internal fabric shield 150 insulates the inflatable belt portion from the hot inflation gas and thereby minimizes the potential of damage to the inflatable textile structure of the inflatable belt portion. An internal fabric shield is not required for all embodiments of the inflatable belt portion 104. For those embodiments of an inflatable belt portion that are inherently sufficiently strong to resist rupture due to rapid inflation with a heated gas, no internal fabric shield is needed. For those embodiments of an inflatable belt portion that are not inherently sufficiently strong to resist rupture during rapid inflation, an internal fabric shield or other thermal insulation is needed. In practice, for the same inflatable belt portion, this may be dependent upon the source of inflation gas. Where the gas source produces gas at a relatively high temperature that could degrade the material from which the inflatable belt portion is formed, an internal fabric shield is recommended to protect the inflatable belt portion. Where the gas source does not produce gas at a relatively high temperature that could degrade the material from which the inflatable belt portion is formed, an internal fabric shield is not needed. However, such an internal fabric shield can be employed to locally strengthen the inflatable belt portion to resist the shock of rapid inflation, thereby enabling use of a lighter and weaker fabric for the main tube of the inflatable belt portion.

Inflatable belt assemblies are costly. It is accordingly desirable that the unitary belt 100 becomes inflated only when it is intended to be used. To accomplish this, a switch 144 (FIG. 5) may be disposed in the retainer 122 at a position where the coupling member is coupled to the retainer 122. The switch 144 is closed only when the coupling member 116 is coupled to the retainer 122. The switch 144 is connected in a circuit with the connector pins 24 in FIG. 2. As a result, the inflator 10 is actuated to obtain combustion of the pyrotechnic material 30 only when the switch 144 is closed. This prevents the inflatable belt portion 104 from being inflated except when the occupant intends to obtain the protection provided by the unitary belt 100.

The system constituting this invention has certain important advantages in its individual sub-systems and in its assembly relationship. For example, the inflator 10 provides an almost instantaneous opening of the container 32 (FIGS. 1 and 2) and inflation of the inflatable belt portion, the composition of the pyrotechnic material 30 produces environmentally friendly gas, and there are a minimal number of components in the inflator 10. The inflator 10 of this invention also provides for substantially uniform operating characteristics in the unitary belt 100 even with considerable changes in the ambient temperature in the vicinity of the vehicle. Where the inflatable belt portion has multiple chambers (FIGS. 15 and 16) that are sequentially inflated, greater protection of the occupant is possible than in the past. Where the inflatable belt portion is provided with warps 194 of increased strength (FIG. 16), rupture of the inflatable belt portion will not result in loss of restraint.

The unitary belt 100 also has certain important advantages. When the inflatable belt portion 104 becomes inflated, it protects the occupant's chest, neck and head. It also tightens the lap belt portion 112 against the occupant across the occupant's lap. This provides additional protection for the occupant's lower extremities. When the occupant desires to enter or exit the occupant door 110, the coupling member 116 is detached from the retainer 122 and the lap belt portion 112 becomes disposed (e.g. wound) on the retractor 124. This disposes the inflatable belt portion 104 substantially along the seat 108 at a position to the rear of the door 110 as shown in FIG. 8.

The system constituting this invention also has other advantages over the prior art. For example, the housing 12 is disposed adjacent the opening 40 and the optional conduit 42. This helps to minimize the time for the inflatable belt portion 104 to become inflated. It also minimizes the weight of the inflator 10 and the space occupied by the inflator. The minimization in the weight of the inflator 10 and the space occupied by the inflator also minimizes the amount of the pyrotechnic material 30 in the inflator. The combustion of the pyrotechnic material 30 produces by-products and end products that do not require a filter to be included in the inflator.

The system of this invention is also advantageous in the disposition of the cover 105 (FIG. 9) in enveloping relationship to the inflatable belt portion 104 to protect the inflatable belt portion and control the inflation of the inflatable belt portion. The system is also advantageous in disposing the switch 144 in the retainer 122 to provide for the operation of the system only when the switch is closed by the disposition of the coupling member 116 in the retainer.

Although this invention has been disclosed and illustrated with reference to particular embodiments, the principles involved are susceptible for use in numerous other embodiments that will be apparent to persons skilled in the art. Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

In addition, the invention is considered to reside in all workable combinations of features herein disclosed, whether initially claimed in combination or not and whether or not disclosed in the same embodiment. The invention is, therefore, to be limited only as indicated by the scope of the appended claims.

What is claimed is:

1. An inflatable seat belt restraint system for protecting an occupant in a seat of a vehicle in the event of a collision involving the vehicle, the inflatable seat belt restraint system comprising:

a unitary belt having an inflatable member and a lap belt portion, an inflator in fluid communication with the inflatable member of the unitary belt, wherein the inflatable member of said unitary belt comprises a seamless hollow textile structure that extends diagonally across the chest of the occupant, wherein a first end of the inflatable member is connected to a first retractor that is anchored to the vehicle and a second end of the inflatable member is connected to a first end of the lap belt portion, wherein the inflatable member is a continuously woven material of varying diameter when inflated, wherein a second end of the lap belt portion is connected to a second retractor that is anchored to the vehicle;

wherein at least part of the inflatable member is plastically expansible in diameter without rupture when subjected to inflation over a predetermined pressure, wherein the first end and a center portion of the inflatable member are resistant to being plastically expansible in diameter when subjected to said predetermined pressure, and wherein the second end portion may plastically expand without rupture in response to inflation.

2. The inflatable seat belt restraint system of claim 1, wherein the continuously woven material is pleated prior to inflation.

3. The inflatable seat belt restraint system of claim 1, wherein the pleated woven material is encased in a frangible cover that is ruptured upon inflation of the inflatable member.

4. The inflatable seat belt restraint system of claim 1, wherein the inflated diameters of the first and second ends of the inflatable member are less than the inflated diameter of the center portion of the inflatable member.

5. The inflatable seat belt restraint system of claim 4, wherein the diameter of the center portion is larger than the diameters of the first and second ends of the inflatable member, and wherein the center portion extends diagonally across the chest of the occupant.

6. The inflatable seat belt restraint system of claim 5, wherein the center portion also extends diagonally across the neck and head of the occupant.

7. The inflatable seat belt restraint system of claim 1, wherein the number of warp ends per unit of circumference of the inflatable member decreases as the diameter of the inflatable member increases.

8. The inflatable seat belt restraint system of claim 1, wherein the inflatable member has at least some weft members adjacent the second end of the inflatable member that comprise plastically extensible filamentary material.

9. The inflatable seat belt restraint system of claim 1, wherein the inflator and inflatable member are configured so that inflation of the inflatable member causes the unitary belt to tighten against the occupant.

10. An inflatable seat belt restraint system for protecting an occupant in a seat of a vehicle in the event of a collision involving the vehicle, the inflatable seat belt restraint system comprising:

a unitary belt having an inflatable member and a lap belt portion, wherein the inflatable member of said unitary belt comprises a seamless hollow textile structure that extends diagonally across the chest of the occupant, wherein a first end of the inflatable member is connected to a first retractor that is anchored to the vehicle and a second end of the inflatable member is connected to a first end of the lap belt portion, wherein the inflatable member is a continuously woven material of varying diameter when inflated, and wherein a second end of the lap belt portion is connected to a second retractor that is anchored to the vehicle; and an inflator in fluid communication with the inflatable member of the unitary belt, wherein said inflatable member further comprises an integrally woven stiffener that resists twisting of the inflatable member and carries most of the load when the belt is tensioned in a collision.

11. The inflatable seat belt restraint system of claim 10, wherein the integrally woven stiffener comprises larger warp members that contact the occupant.

12. An inflatable seat belt restraint system for protecting an occupant in a seat of a vehicle in the event of a collision involving the vehicle, the inflatable seat belt restraint system comprising:

a unitary belt having an inflatable member and a lap belt portion, wherein the inflatable member of said unitary belt comprises a seamless hollow textile structure that extends diagonally across the chest of the occupant, wherein a first end of the inflatable member is connected to a first retractor that is anchored to the vehicle and a second end of the inflatable member is connected to a first end of the lap belt portion, wherein the inflatable member is a continuously woven material of varying diameter when inflated, and wherein a second end of the lap belt portion is connected to a second retractor that is anchored to the vehicle; and an inflator in fluid communication with the inflatable member of the unitary belt, wherein the inflatable member comprises at least a first and second integrally woven chambers, wherein the first inflatable chamber is inflated before the second inflatable chamber, and wherein the second inflatable chamber is inflated with gas from the first inflatable chamber.

13. The inflatable seat belt restraint system of claim 12, wherein the first and second inflatable chambers are sequentially inflated.

14. The inflatable seat belt restraint system of claim 1, wherein the number of weft ends per unit of length of the inflatable member increases as the size of the inflatable member increases.

15. The inflatable seat belt restraint system of claim 14, wherein the center portion of the inflatable member has a greater number of warps than the first and second ends of the inflatable member.

16. The inflatable seat belt restraint system of claim 14, wherein the center portion of the inflatable member has the same number of warps as the first and second ends of the, inflatable member.

17. The inflatable seat belt restraint system of claim 14, wherein at least some of the weft members of the center portion of the inflatable member are made of plastically extensible filamentary material.

18. The inflatable seat belt restraint system of claim 1, wherein the inflator is disposed within the inflatable member.

19. The inflatable seat belt restraint system of claim 1, further comprising a trigger that signals to the inflator when the unitary belt is buckled to a retainer.

20. An inflatable seat belt restraint system for protecting an occupant in a seat of a vehicle in the event of a collision involving the vehicle, the inflatable seat belt restraint system comprising:

a unitary belt having an inflatable member comprising a seamless hollow textile structure of varying diameter extending across the body of the occupant, the inflatable member having first and second ends extending between the inboard side and outboard side of the seat;

a retractor connected to the first end of the inflatable member;

an inflator in fluid communication with the inflatable member of the unitary belt wherein the inflator inflates a portion of the unitary belt that extends across the lap of the occupant, and wherein the retractor is positioned under the seat, and wherein the inflator is disposed between the retractor and the unitary belt.

21. The inflatable seat belt restraint system of claim 20, wherein the inflator is disposed externally of the inflatable member.

* * * * *